United States Patent
Ma et al.

(10) Patent No.: US 12,262,730 B2
(45) Date of Patent: Apr. 1, 2025

(54) SMOKING ARTICLE MACHINE

(71) Applicants: Yao Wu Ma, Shandong (CN); Calvin Tse, San Leandro, CA (US); Xiaochen Ji, San Leandro, CA (US); Donny Sun, San Leandro, CA (US)

(72) Inventors: Yao Wu Ma, Shandong (CN); Calvin Tse, San Leandro, CA (US); Xiaochen Ji, San Leandro, CA (US); Donny Sun, San Leandro, CA (US)

( * ) Notice: Subject to any disclaimer, the term of this patent is extended or adjusted under 35 U.S.C. 154(b) by 957 days.

(21) Appl. No.: 16/539,682

(22) Filed: Aug. 13, 2019

(65) Prior Publication Data
US 2020/0138092 A1 May 7, 2020

Related U.S. Application Data

(63) Continuation of application No. 16/539,617, filed on Aug. 13, 2019, now Pat. No. 10,791,757.

(60) Provisional application No. 62/755,273, filed on Nov. 2, 2018.

(51) Int. Cl.
| | | |
|---|---|---|
| A24C 5/10 | (2006.01) | |
| A24B 1/04 | (2006.01) | |
| A24B 5/02 | (2006.01) | |
| A24C 5/39 | (2006.01) | |
| A24C 5/47 | (2006.01) | |
| A24D 1/18 | (2006.01) | |
| B65G 47/84 | (2006.01) | |

(52) U.S. Cl.
CPC .......... *A24C 5/10* (2013.01); *A24B 1/04* (2013.01); *A24B 5/02* (2013.01); *A24C 5/392* (2013.01); *A24C 5/399* (2013.01); *A24C 5/478* (2013.01); *A24D 1/18* (2013.01); *B65G 47/846* (2013.01)

(58) Field of Classification Search
None
See application file for complete search history.

(56) References Cited

U.S. PATENT DOCUMENTS

| | | | | |
|---|---|---|---|---|
| 1,998,146 A | * | 4/1935 | Smith ................. | A24C 5/18 |
| | | | | 131/66.1 |
| 2,208,504 A | * | 7/1940 | Arelt ................. | A24C 5/18 |
| | | | | 131/61.1 |

(Continued)

FOREIGN PATENT DOCUMENTS

GB  2 156 987  * 10/1985

*Primary Examiner* — Dionne W. Mayes
(74) *Attorney, Agent, or Firm* — My Patent Guys; Christopher Pilling; Johan Eide

(57) ABSTRACT

A machine for making plant material smoking articles is provided having a feeding assembly that is configured to feed plant material to a combustible material rolling assembly. The combustible material rolling assembly includes a continuous stream of paper and a forming chute having a semispherical channel at a length and at least one adjustable guide. The combustible material rolling assembly is configured to roll the plant material in the continuous stream of paper at a wrapping rate within the semispherical channel to make at least one plant material smoking article. In some embodiments, the feeding assembly is either driven via gravity or a pneumatic delivery system. In one embodiment, at least one adjustable guide includes a tapered conical guide configured to additionally adjust the wrapping rate.

11 Claims, 33 Drawing Sheets

(56) References Cited

U.S. PATENT DOCUMENTS

| | | | |
|---|---|---|---|
| 2,958,365 A * | 11/1960 | Molins | A24C 5/471 |
| | | | 83/337 |
| 3,348,551 A * | 10/1967 | Pinkham | A24C 5/18 |
| | | | 131/109.1 |
| 2005/0051181 A1 * | 3/2005 | Okamoto | A24C 5/1807 |
| | | | 131/58 |
| 2005/0172977 A1 * | 8/2005 | Jadot et al. | A24D 1/025 |
| | | | 131/365 |

* cited by examiner

SMOKING ARTICLE MACHINE

RELATED APPLICATION

This application claims priority to provisional patent application U.S. Ser. No. 62/755,273 filed on Nov. 2, 2018, and is a continuation of U.S. Ser. No. 16/539,617 filed on Aug. 13, 2019, the entire contents of which are herein incorporated by reference.

BACKGROUND

1. Field of the Invention

The present invention relates to a smoking article machine for forming a plant material smoking article.

2. Description of Related Art

The popularity and stigma of smoking tobacco has recently been negatively affected, as more carcinogenic and health data is publicly published. This has caused the popularity of smoking traditional tobacco cigarettes to decline greatly in popularity. Furthermore, recent spikes in taxes on tobacco and tobacco affiliated products have also driven down the consumer popularity of buying traditional tobacco cigarettes. Consequently, it is now more popular and economically viable to produce smoking articles comprising a plant material or a mixed plant material, such as *cannabis*, to appeal to the consumer and to reduce the realized cost to the consumer.

Additionally, known cigarette making machines are behind modern advancements in technology. Traditional curing and manufacturing processes related to tobacco based smoking articles vary greatly when compared to the curing, processing, and manufacturing processes of other plant material smoking articles. Variable factors of controlling tobacco particle size, compression of tobacco within the combustible material, and filter insertion do not provide the same desired result when dealing with plant materials other than tobacco.

Furthermore, smoking articles need a high level of uniformity for retail packaging and consistency of a deliverable product to the consumer. Reliability of traditional machines is known to be low, especially as the combustible material of most smoking articles are prone to folding, shearing, and deforming through the cigarette forming process. When a break in the production cycle does occur, the entire cigarette forming process stops, and successive parts of traditional forming machines need to be reconfigured, replaced, or reset to restart the production of smoking articles forming process. As previously stated, the occurrence of this stoppage is only exponentially increased as plant material other than tobacco is added to the tobacco or substituted for tobacco.

Consequently, different methods and machines are necessary to prepare plant material for forming and to form plant material smoking articles. Furthermore, different control systems utilizing temperature controls, humidity control, and inspection controls are needed to optimize the forming of plant material smoking articles and the surrounding environment that the forming machine and method occur in.

Exemplary prior art for tobacco cigarette forming machines includes U.S. Ser. No. 10/645,996, to Hancock et. al., which claims an entrance cone for creating a tobacco cigarette, as shown in FIG. 12 and FIG. 13, that is specifically adapted for the rolling of shredded tobacco material. Similarly, another exemplary prior art having forming machines can be viewed in U.S. Ser. No. 09/776,776, to Okumoto et. al., which claims a molding bed of a compression molding apparatus for molding paper around shredded tobacco. These machines would prove to be ineffective when used with other materials outside of shredded tobacco. This is due largely in part to the material properties of shredded tobacco having low adherent properties. These low adherent properties allow for easy movement of shredded tobacco during forming as the paper is abruptly closed around the shredded tobacco and the shredded tobacco is free to move within the paper as needed.

Secondly, the moisture content desired in shredded tobacco is much lower than other plant materials to be smoked, such as *cannabis*. On top of differing moisture content desired in the resultant smoking article, tobacco cigarette forming machines have no means or compensation for removing dense plant materials such as plant seeds and stems that may enter the machine.

This lack of compensation for removing dense materials is largely due in part to the fact that tobacco seeds are very small in size and are much smaller in size than strands of shredded tobacco themselves. Although tobacco seeds are commonly sorted from tobacco leaves prior to being formed into a cigarette, some seeds still find passage into traditional forming machines. Typical tobacco seeds are estimated to be less than 0.01-0.02 inches in diameter. Wherein other plant materials, such as *cannabis*, typically have seed sizes between 0.06-0.20 inches in diameter. The sheer size of the tobacco seeds allows them to easily be feed through traditional forming machines without breaks in production. Feeding plant material other than tobacco into and running exemplary traditional tobacco cigarette making machines, such as those taught by Hancock et. al. and Okumoto et. al., would result in failure of the machines as seed or stems were attempted to be formed into a cigarette. The seeds and stems would puncture the paper of the cigarette, causing blockage in multiple areas of the machines and would be physically incapable of fitting within the cigarette. In possible situations wherein all dense material is removed or processed from plant material other than tobacco, the exemplary prior art taught above and similar machines would still result in failure due to variability of adherent properties of plant material other than tobacco and the lack of uniformity in processed plant material other than tobacco. The variability of plant material other than tobacco should be accounted for in the forming of cigarettes and the like.

Secondly, consumers commonly desire to smoke plant material other than tobacco for reasons other than taste or nicotine commonly added to tobacco cigarettes. For example, traditional tobacco forming machines are not properly adapted to retain trichomes or other fine outgrowths of various plant materials during the forming of the cigarette. Traditional machines for making cigarettes lack these capabilities to the fact that tobacco leaves do not have trichomes or other fine and delicate plant properties that need to be properly accounted for during the forming of cigarettes and similar smoking articles.

Exemplary mechanisms for feeding tobacco into cigarette forming machines can be seen in the exemplary prior art such as U.S. Pat. Nos. 1,645,067 and 1,817,319, to Muller, which claims both a tobacco spreading machine and a tobacco spreader for cigarette machines respectively. Both exemplary tobacco material related machines claimed by Muller illustrate drums for feeding shredded tobacco into a cigarette forming machine. These machines and the like are not designed for removing dense materials commonly found in other plant materials because they are optimized for only moving shredded tobacco.

An improved system is needed for creating plant material smoking articles comprising largely plant material other than tobacco. An improved system is needed having dense material separating means, mitigation of accumulation plant material throughout the system, assemblies and methods designed for preserving trichomes and other fine outgrowths of various plant materials, and gradual forming means to slowly compress and form plant material within a combustible material when the plant material to be formed has high adherent properties.

SUMMARY

The current invention is directed towards a smoking article machine for producing plant material based smoking articles. The machine is designed to overcome the pitfalls of traditional tobacco processing and cigarette forming machines. Components of the machine carefully guide desirable plant material through a forming process carried out by the smoking article machine.

An object of the present invention is to provide a smoking article machine for forming plant material smoking articles optimized for the minimal accumulation of plant material within and between the various assemblies and components of the smoking article machine.

Another object of the present invention is to provide a wrapping rate of a plant material within a continuous stream of paper that is gradual and slow by varying adjustable means and at least one adjustable guide that is elongated in view of traditional forming garnitures.

Another object of the present invention is to preserve fine outgrowths of various plant materials by providing configurable material assemblies and feeding assemblies for preserving trichomes and fine outgrowths of various plant materials.

In order to do so, a machine for making plant material smoking articles is provided having a feeding assembly that is configured to feed plant material to a combustible material rolling assembly. The combustible material rolling assembly includes a continuous stream of paper and a forming chute having a semispherical channel at a length and at least one adjustable guide. The combustible material rolling assembly is configured to roll the plant material in the continuous stream of paper at a wrapping rate within the semispherical channel to make at least one plant material smoking article. In some embodiments, the feeding assembly is either driven via gravity or a pneumatic delivery system. In one embodiment, at least one adjustable guide includes a tapered conical guide configured to additionally adjust the wrapping rate.

BRIEF DESCRIPTION OF THE FIGURES

The detailed description of some embodiments of the invention is made below with reference to the accompanying figures, wherein like numerals represent corresponding parts of the figures.

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

Figure 1:
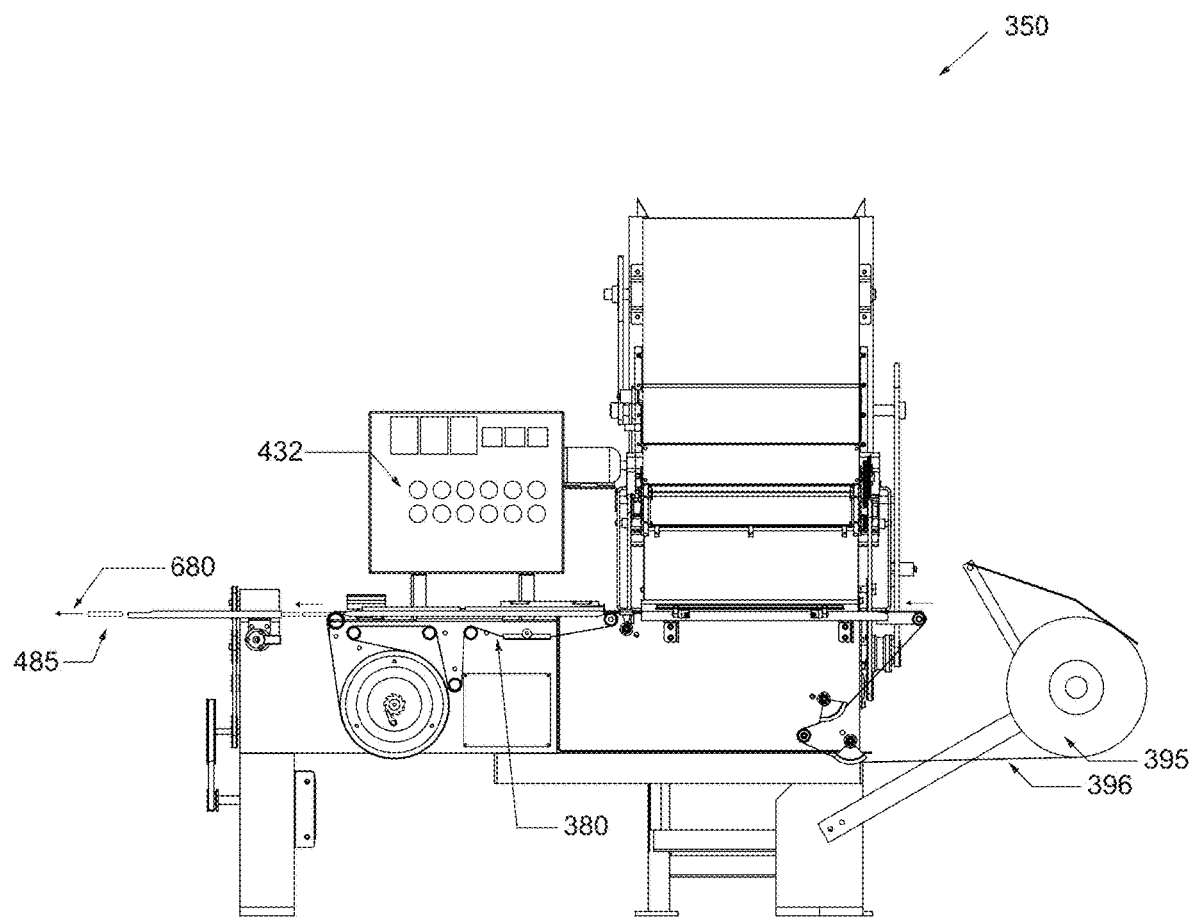
FIG. 1 shows an exemplary front view of one embodiment of the smoking article machine.
Figure 2:
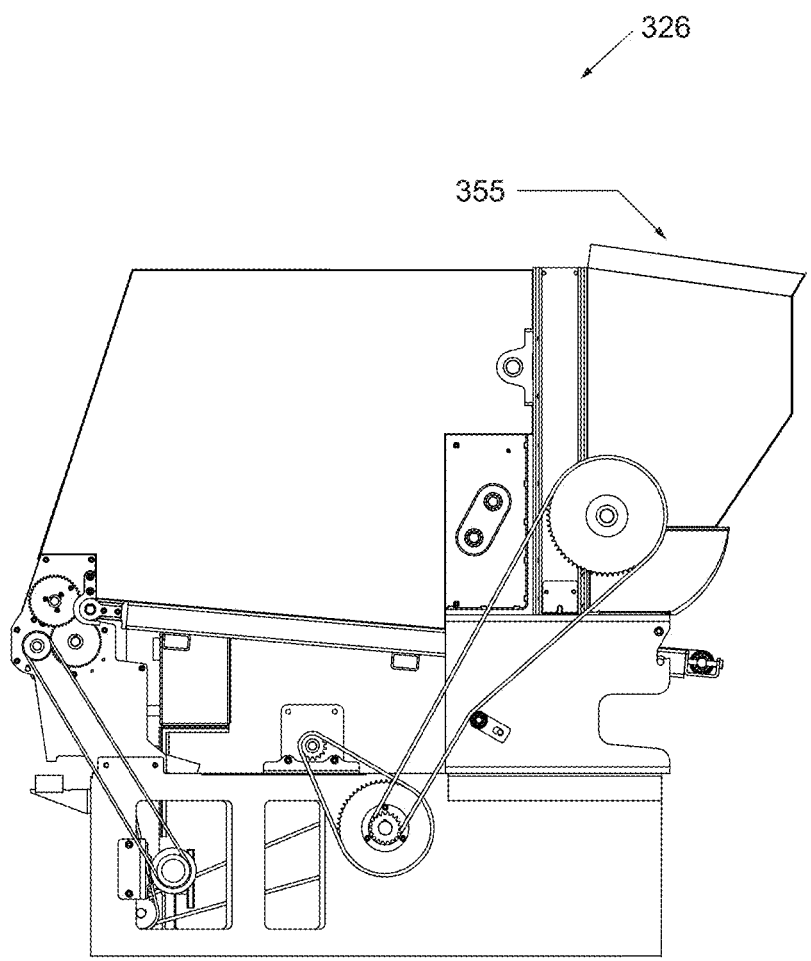
FIG. 2 shows an exemplary right view of one embodiment of the gravity material assembly of the smoking article machine.
Figure 3:
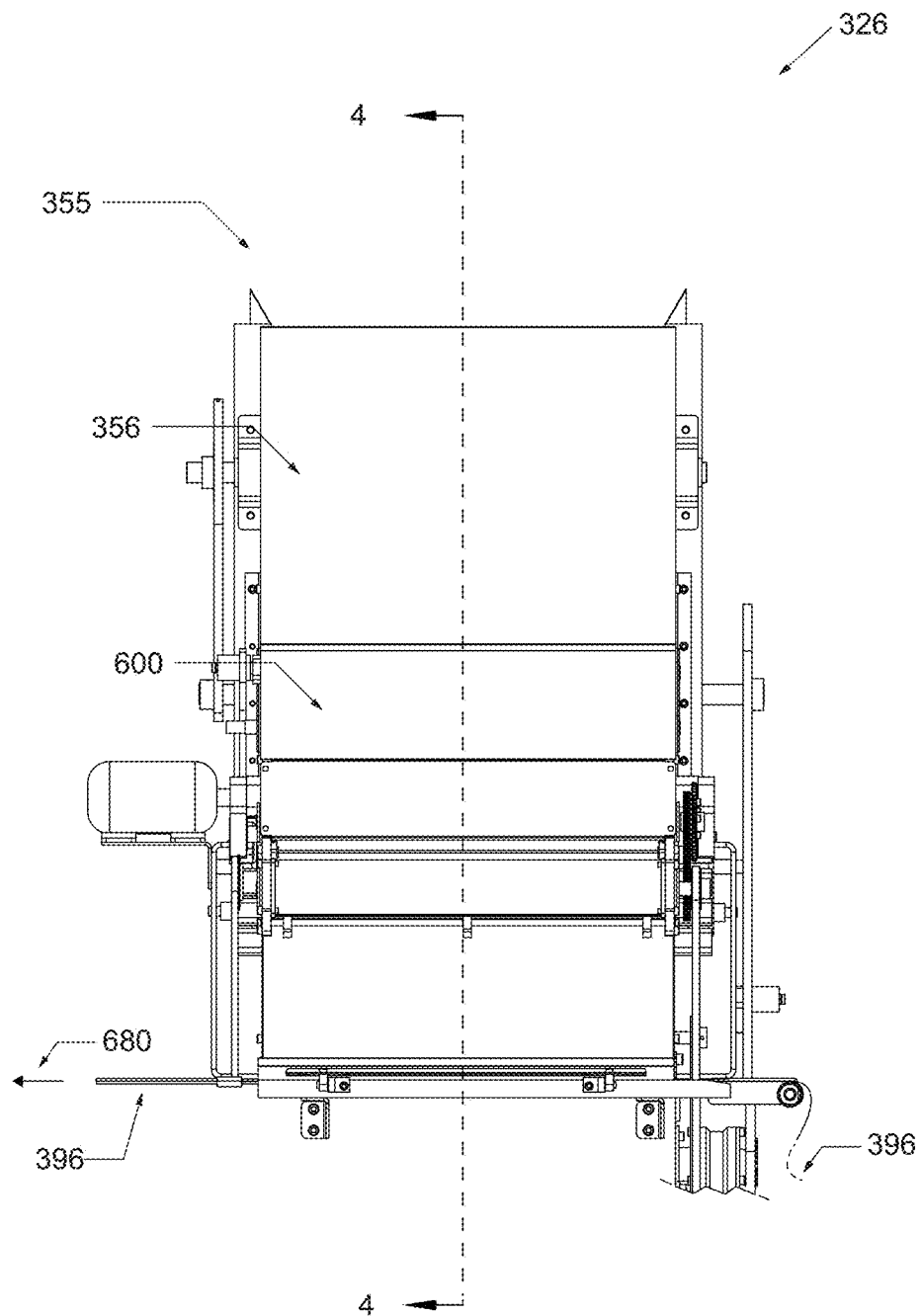
FIG. 3 shows an exemplary front view of one embodiment of the gravity material assembly and the gravity feeding assembly of the smoking article machine and parting line 4-4.
Figure 4:
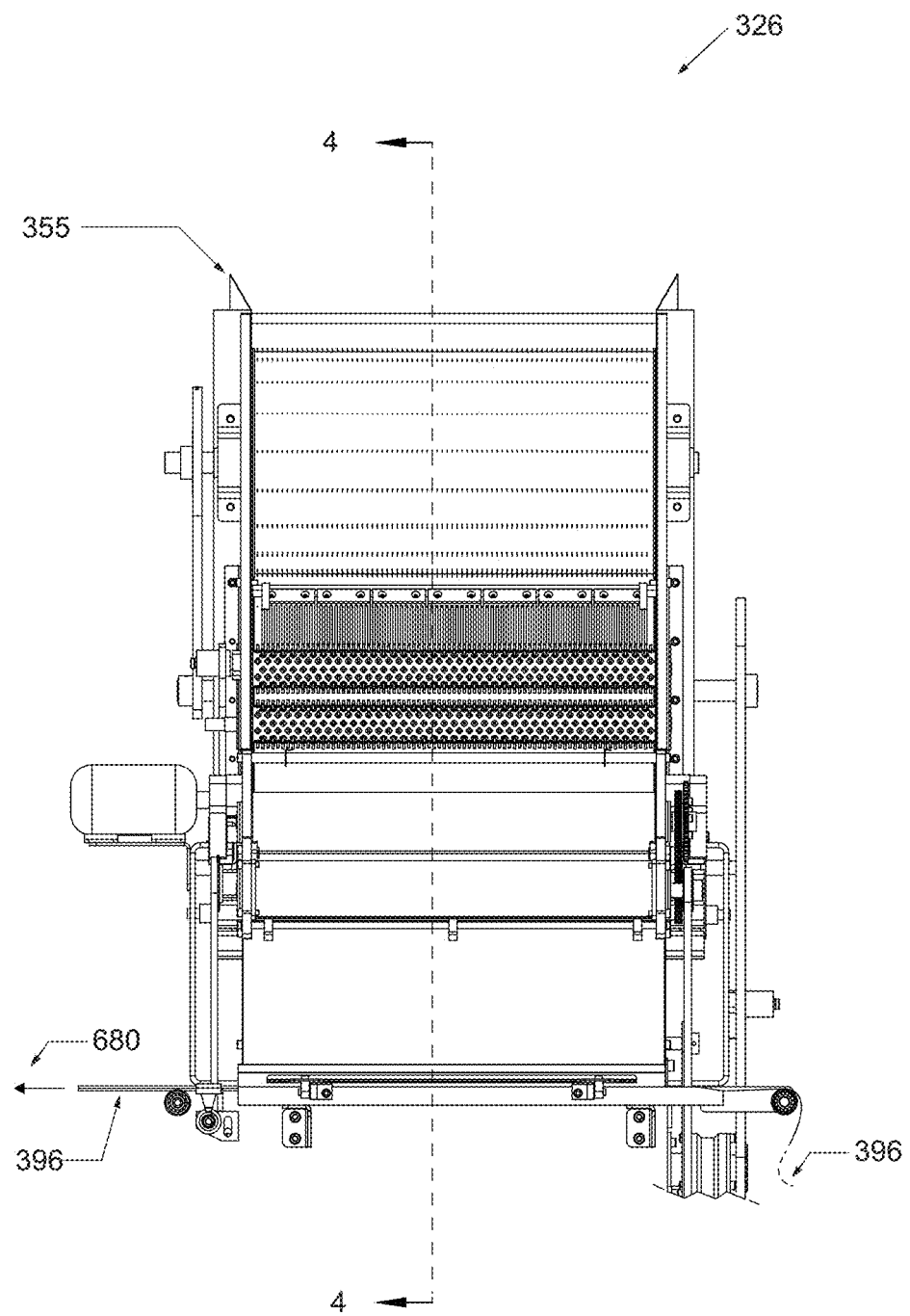
FIG. 4 shows an exemplary front view of one embodiment of the gravity material assembly and the gravity feeding assembly of the smoking article machine and parting line 4-4, with the enclosure hidden from view.
Figure 5:
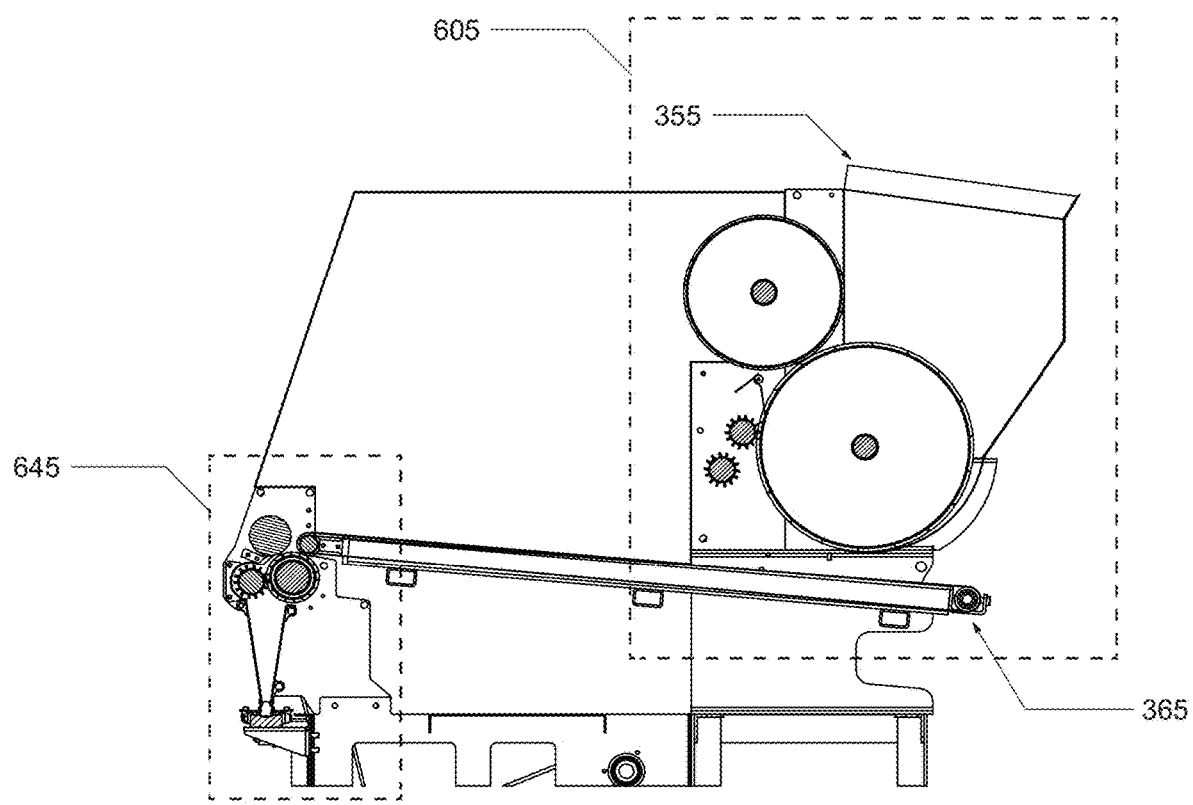
FIG. 5 shows an exemplary cross-sectional view of one embodiment of the gravity material assembly and the gravity feeding assembly of the smoking article machine taken along parting line 4-4 in FIG. 3 and FIG. 4.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" or "an" is defined to mean "at least one." Any reference to "or" herein is intended to encompass "and/or" unless otherwise stated. As used in this application, the term "about" or "approximately" refers to a range of values within plus or minus 10% of the specified number. As used in this application, the term "substantially" means that the actual value is within about 10% of the actual desired value, particularly within about 5% of the actual desired value and especially within about 1% of the actual desired value of any variable, element or limit set forth herein. As used herein, the term "about" refers to an amount that is near the stated amount by about 0%, 5%, or 10%, including increments therein. The word "*cannabis*" is defined to mean "any species of the *cannabis* genus of flowing plants including *cannabis* sativa, *cannabis* indica, *cannabis* ruderalis, and hemp." The terminology includes the words above specifically mentioned, derivatives thereof, and words of similar import.

Referring now to FIGS. 1-5, various views of a smoking article machine 350 are illustrated. The smoking article machine 350 is configured to form a plant material smoking article 485 from a plant material 100. The forming process 345 will be discussed below.

Preferably, the plant material 100 is *cannabis*. Alternatively, the plant material 100 comprises by way of non-limiting example, a tobacco plant, a clove, a damiana, a hash, a spice, a herb, a flowering plant, an artificial flavoring, a bark, a bud, or a root. In some embodiments, the herb includes of at least one the following plant families, by way of non-limiting example, the Cannabaceae plant family, the Malvaceae plant family, the Apiaceae plant family, the Lamiaceae plant family, and the Asteraceae plant family.

The plant material 100 comprises a desirable plant material 125 and an undesirable plant material 126. In the preferred embodiment, the plant material 100 is *cannabis*, and the desirable plant material 125 includes the smokable portions of the *cannabis*, including but not limited to the calyxes (buds), resin, and to a lesser extent, leaves. Conversely, the undesirable plant material 126, for *cannabis*, includes but is not limited to roots, stems, branches, leaves, and seeds. As well known in the art, the plant material 100 will go through standard handling procedures after harvesting, including but not limited to curing, trimming, and grinding, wherein some of the undesirable plant material 126 will already be separated from the desirable portions of the plant material 100. In some embodiments, the plant material 100 will go through a plant material preparation process 101 which will be discussed in greater detail below.

It is a particular advantage of the present invention, to provide a plant material separator 605 that is configured to separate the undesirable plant material 126 from the desirable plant material 125 during operation. This will be discussed in greater detail below. As one in the skill in the art may formulate, the invention may be modified for the use of other plant materials, as discussed above, however the machine, and elements of the machine, have been optimized for use with *cannabis* providing an improved smoking article machine for use with *cannabis* compared to the machines of the prior art.

In one embodiment, the smoking article machine 350 includes at least one of the following assemblies: a control assembly 432, a pneumatic plant material assembly 325, a gravity plant material assembly 326, a combustible material rolling assembly 330, a rotational transfer assembly 430, a filter assembly 335, and an inspection assembly 340. Each assembly will now be described in detail below.

In one embodiment, the gravity plant material assembly 326 comprises a plant material hopper 355, a plant material separator 605, and a gravity feeding assembly 645. In one embodiment, the plant material hopper 355 is configured to receive the plant material 100 and feed the plant material 100 to the plant material separator 605. In other embodiments, the smoking article machine 350 is configured to have a pneumatic plant material assembly 325 and a pneumatic feeding assembly 646. In one embodiment, the gravity plant material assembly 326 and the pneumatic plant material assembly 325 can be configured to include an enclosure 356 surrounding the plant material 100 processed within.

Figure 6:
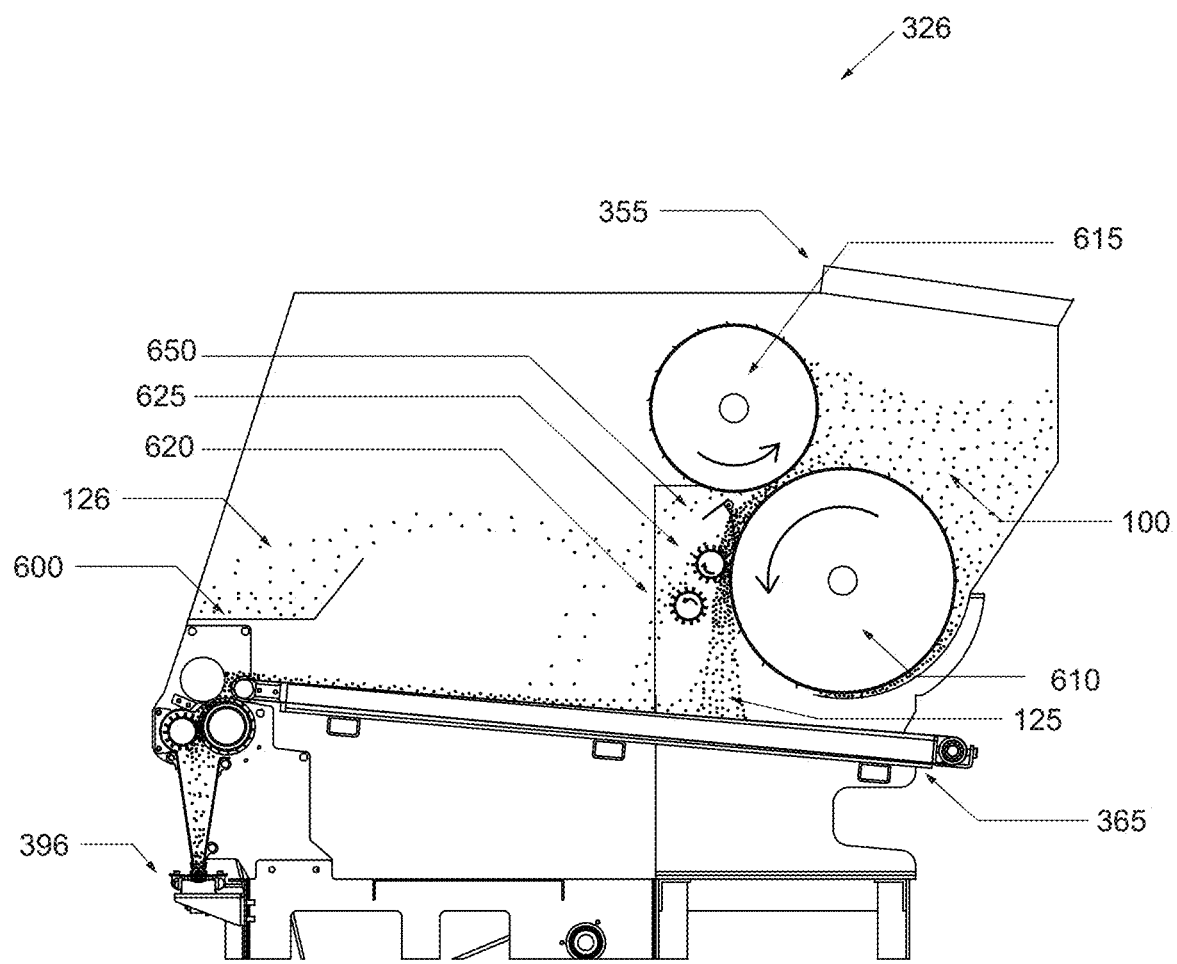
FIG. 6 shows an exemplary cross-sectional view of one embodiment of the gravity material assembly and the gravity feeding assembly of the smoking article machine taken along parting line 4-4 in FIG. 3 and FIG. 4.
Figure 7:
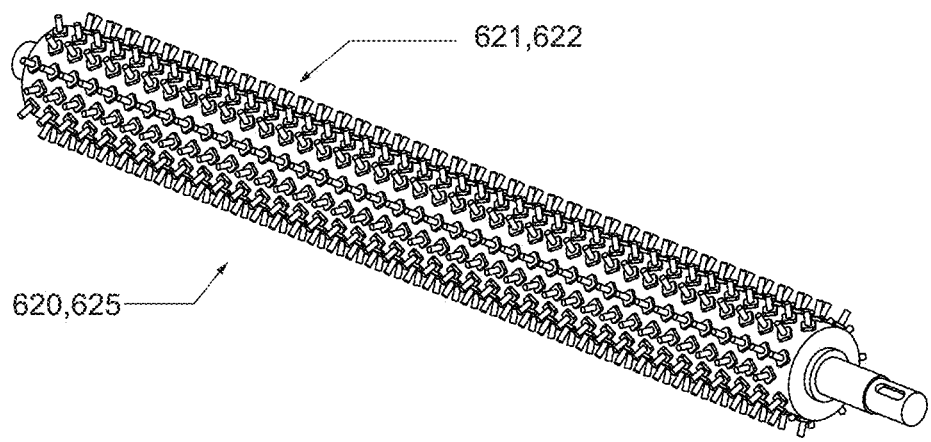
FIG. 7 shows an exemplary perspective view of one embodiment of the third roller and the fourth roller of the smoking article machine.

Been seen in FIGS. 6-7, the plant material separator 605 is configured to separate the undesirable plant material 126 from the desirable plant material 125. In one embodiment, the plant material separator 605 comprises a first roller 615, a second roller 610, a third roller 620, and a fourth roller 625. The first roller 615 having a first diameter configured to rotate in a counter-clockwise direction at a first speed, the second roller 610 having a second diameter configured to rotate in a counter-clockwise direction at a second speed, the third roller 620 having a third diameter configured to rotate in a counterclockwise direction at a third speed, and the fourth roller 625 having a fourth diameter configured to rotate in a clockwise direction at a fourth speed. The first roller 615 is configured to thin out the plant material. The first roller 615 and the second roller 610 are positioned approximate to the plant material hopper 355, such that as the plant material 100 passes through the plant material hopper 355, the plant material 100 is pressed between the first roller 615 and the second roller 610 separating the plant material 100 into the desirable plant material 125 and the undesirable plant material 126, sending the plant material to a first directional path. Next, the plant material is compressed via comb 650 into position, wherein the plant material is fed to the fourth roller 625, which spins the plant material to the third roller 620, wherein the third roller 620 is configured to redirect the undesirable plant material 126 a second directional path. In some embodiments, a portion of the thinned out plant material from the first roller 615 travels along a third directional path, wherein the third directional path is substantially parallel to the first directional path and the thinned out plant material is desirable plant material.

Advantageously, a catch depository 600 is positioned to catch the undesirable plant material 126 from the second directional path within the enclosure 356. The catch deposit may be adjoined, slidably engaged, or hingedly connected to the enclosure 356. In one embodiment, the comb 650 includes a series of teeth aids and guides the plant material 100 through the plant material separator 605. In some embodiments, the comb 650 is further designed and sized to substantially match a gap between any of the pluralities of protrusions 621 on any of the rollers of the smoking article machine 350. In some embodiments, the comb 650 is adjustable. In some embodiments, the comb 650 is oriented in a fixed position. In some embodiments, the comb is 650 configured to compact the desirable plant material against the second roller.

The details of the undesirable plant material 126 and the desirable plant material 125 were previously discussed for the preferred use of *cannabis*. The material separator takes advantage of the properties and characteristics of the plant material 100. For instance, the undesirable plant material 126, such as stems and seeds, is denser than the desirable plant material 125, such as the ground bud. Thus, the undesirable plant material flies further when passing through the rollers and more specifically the third roller 620 flicks or displaces the undesirable plant material into the catch depository 600. The catch depository 600 is removable from assembly 430 and the enclosure 356 such that the undesirable plant material 126 may be discarded or used in other applications. In one embodiment, the catch depository 600 is a removable drawer slidably engaging the enclosure 356.

Figure 8:
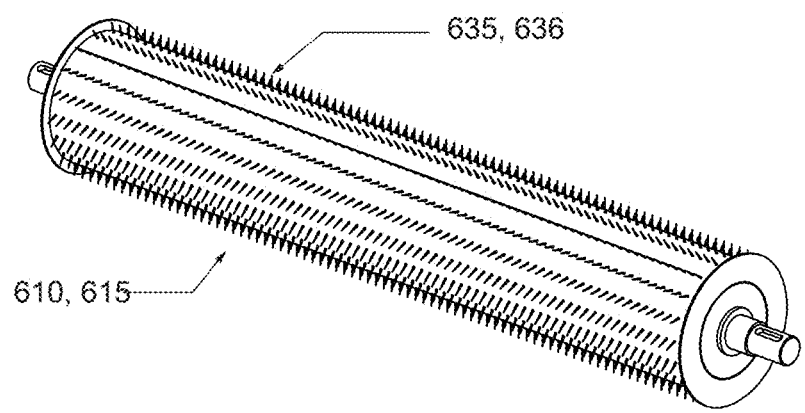
FIG. 8 shows an exemplary perspective view of one embodiment of the first roller and the second roller of the smoking article machine.
Figure 9:
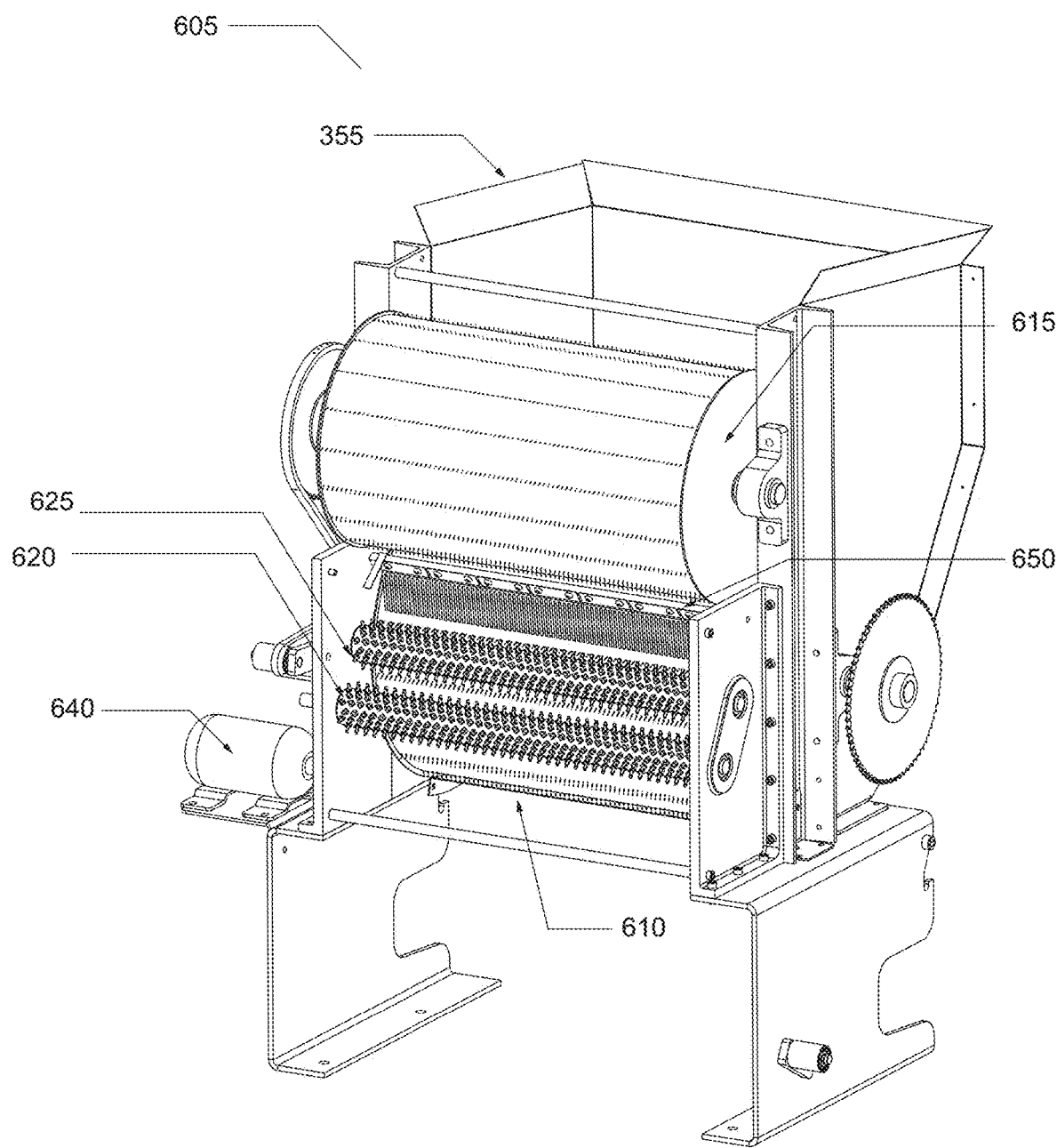
FIG. 9 shows an exemplary perspective view of one embodiment of the plant material separator of the smoking article machine.

Best seen in FIGS. 7-8, each of the rollers include a plurality of protrusions 621. The first roller 615 and the second roller 610 include a first plurality of protrusions 635 and a second plurality of protrusions 636, respectively. The third roller 620 and the fourth roller 625 include a third plurality of protrusions 621 and a fourth plurality of protrusions 622, respectively. It should be understood, that these are merely examples, and the protrusions 621 may be selected from a protrusion set essentially consisting of: a pointed protrusion, a cylindrical protrusion, a tapered cylindrical protrusion, a tab, a threaded protrusion, a brush, or any combination thereof. The protrusions should be selected for the desired function. As an example, the first plurality of protrusions 635 and the second plurality of protrusions 636 are sharp pointed protrusions, such that when in combination with the diameter and rotation of the first roller 615 and the second roller 610 rotating at the first and second speed respectively, the sharp pointed protrusions further grind the plant material 100, separating the seeds and stems from the smokable bud or flower material. As well known in the art, smoking the seeds and stems leads to undesirable flavors and harsh smoke, which is undesirable for the user.

As previously discussed, the undesirable plant material 126 is collected in the catch depository 600, preventing the undesirable plant material 126 from being used in the further processes and assemblies of the machine such that the smoking articles produced will be comprised of substantially the desirable plant material 125.

Figure 10:
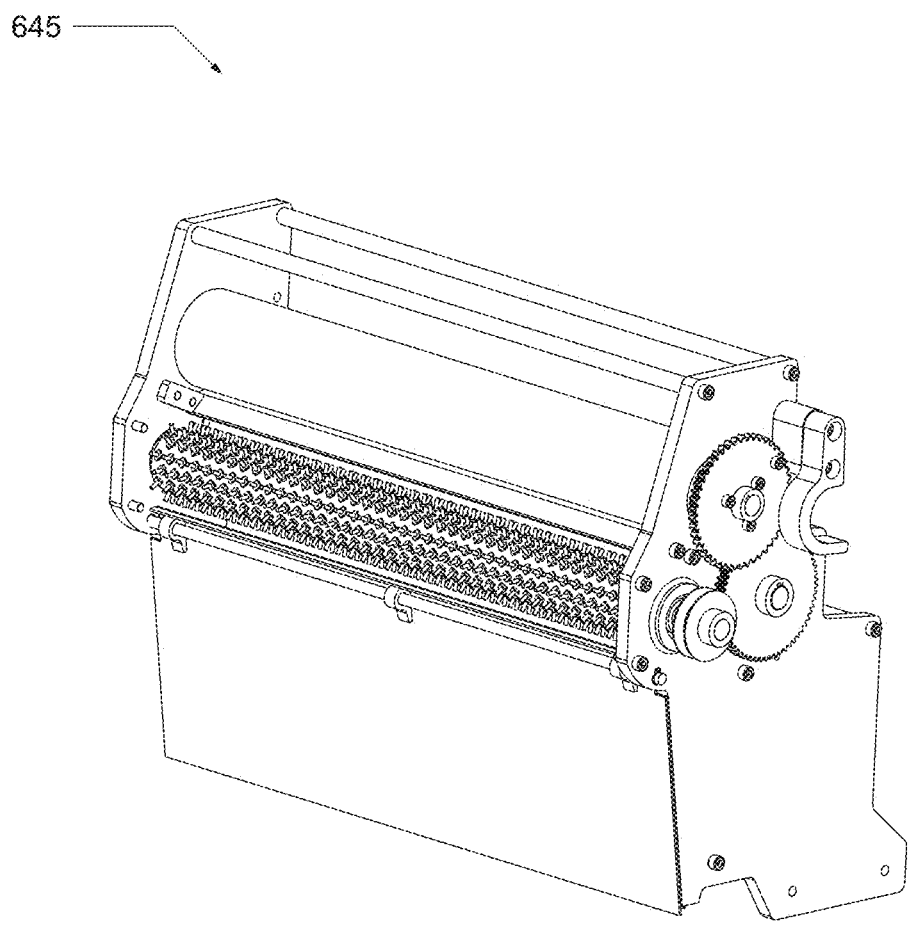
FIG. 10 shows an exemplary perspective view of one embodiment of the gravity feeding assembly of the smoking article machine.
Figure 11:
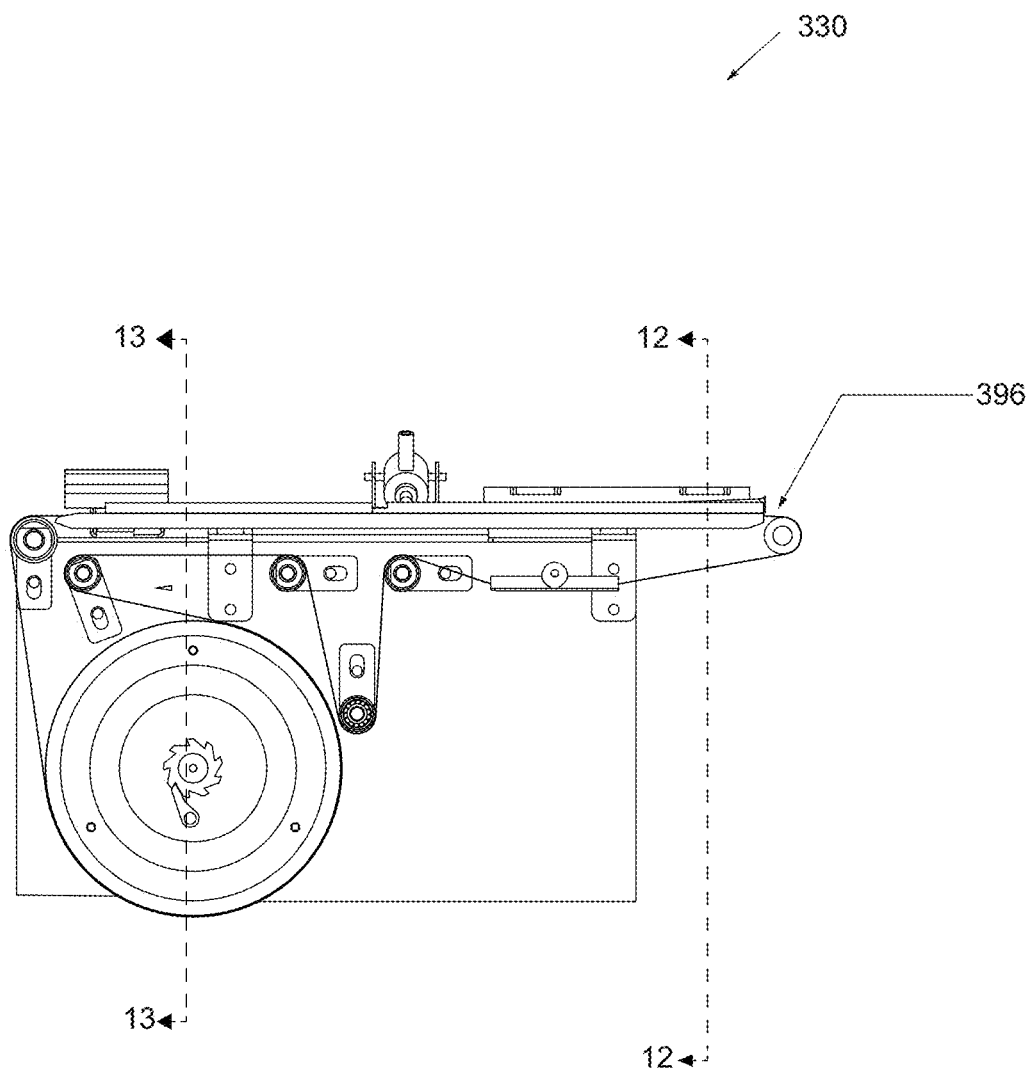
FIG. 11 shows an exemplary front view of one embodiment of the combustible material rolling assembly of the smoking article machine, as well as parting line 12-12 and parting line 13-13.
Figure 12:
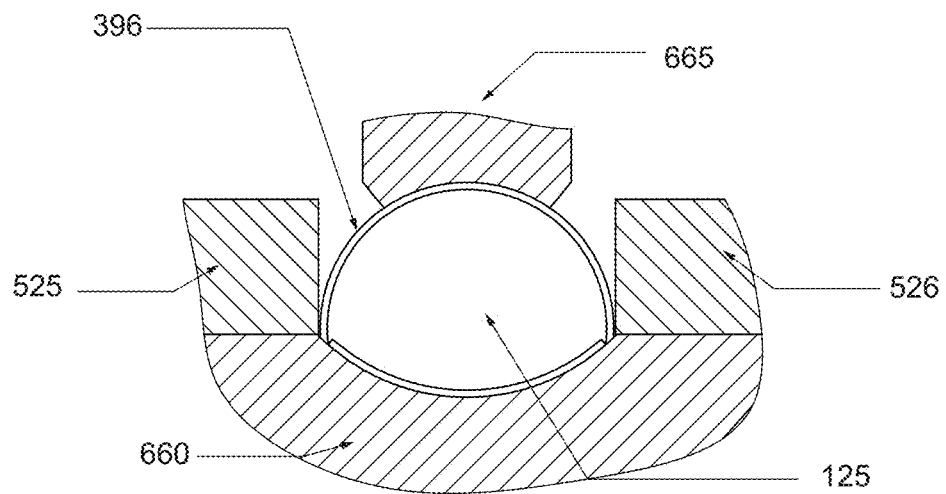
FIG. 12 shows an exemplary cross-sectional view of one embodiment of the combustible material rolling assembly of the smoking article machine taken along parting line 12-12 of FIG. 11.
Figure 13:
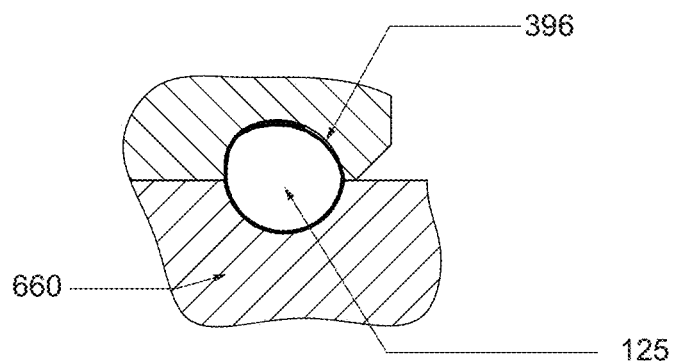
FIG. 13 shows an exemplary cross-sectional view of one embodiment of the combustible material rolling assembly of the smoking article machine taken along parting line 13-13 of FIG. 11.
Figure 14:
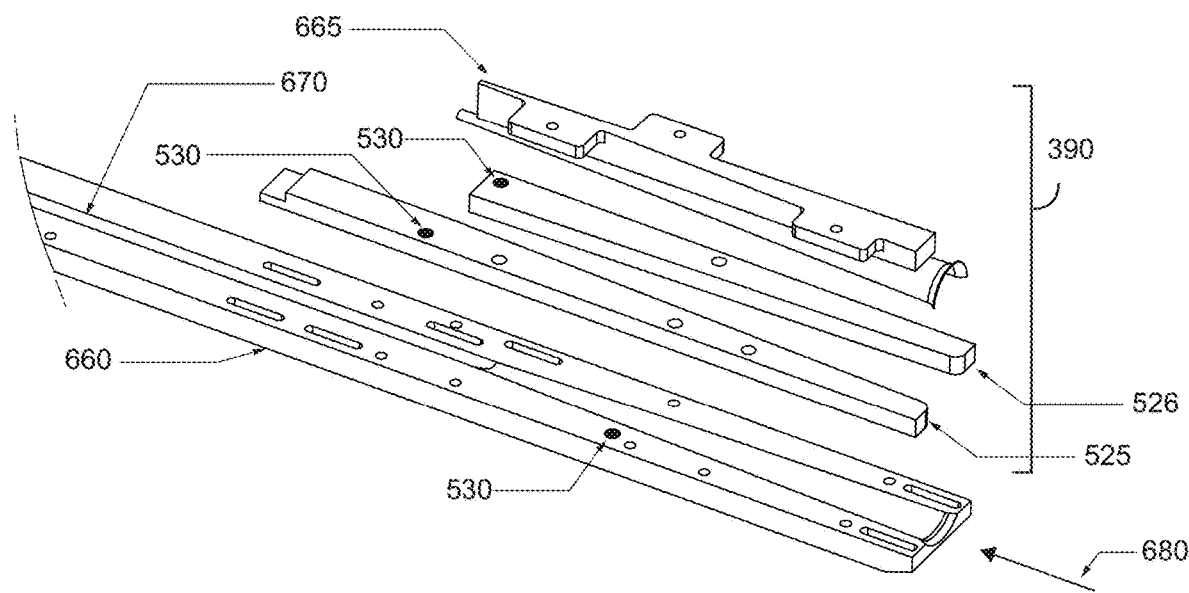
FIG. 14 shows an exemplary perspective view of one embodiment of the at least one adjustable guide of the smoking article machine.
Figure 15A:
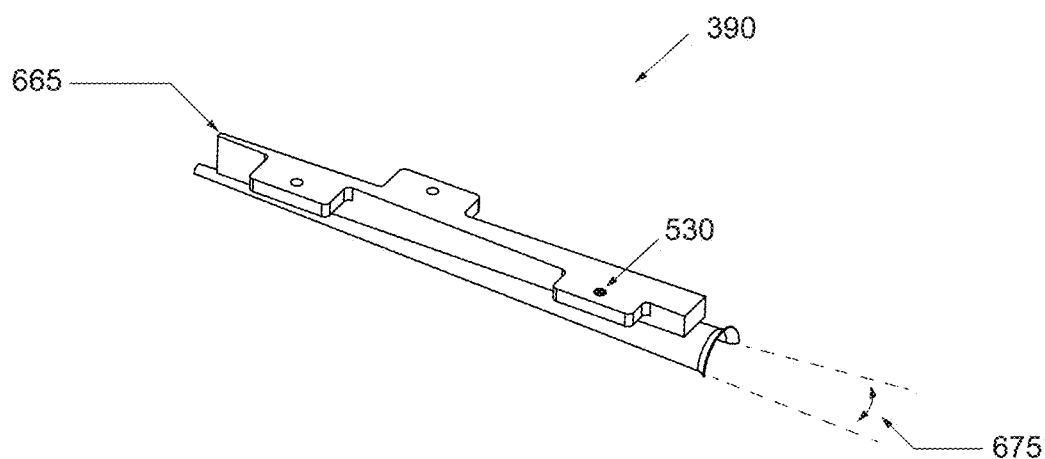
FIG. 15A shows an exemplary perspective view of one embodiment of the tapered conical guide of the smoking article machine.
Figure 15B:
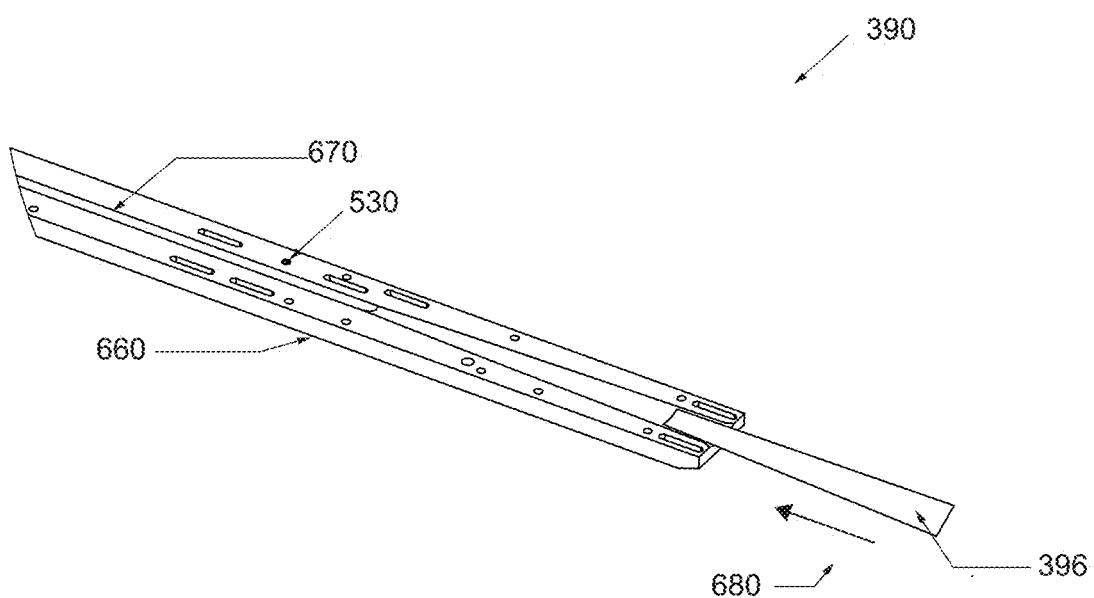
FIG. 15B shows an exemplary perspective view of one embodiment of the forming chute of the smoking article machine.
Figure 15C:
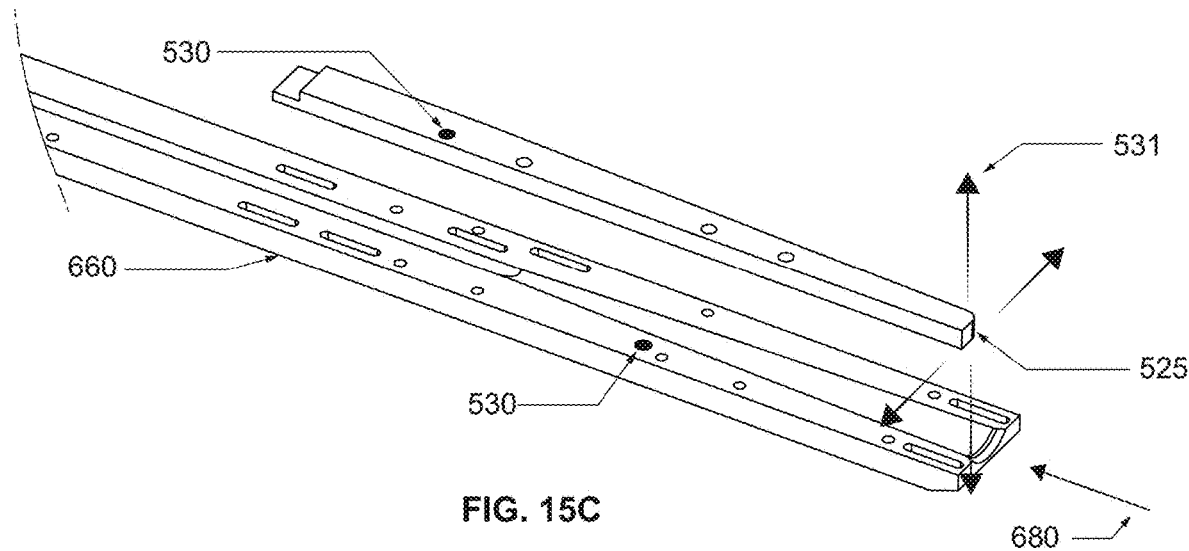
FIG. 15C shows an exemplary perspective view of one embodiment of the at least one adjustable guides of the smoking article machine.
Figure 15D:
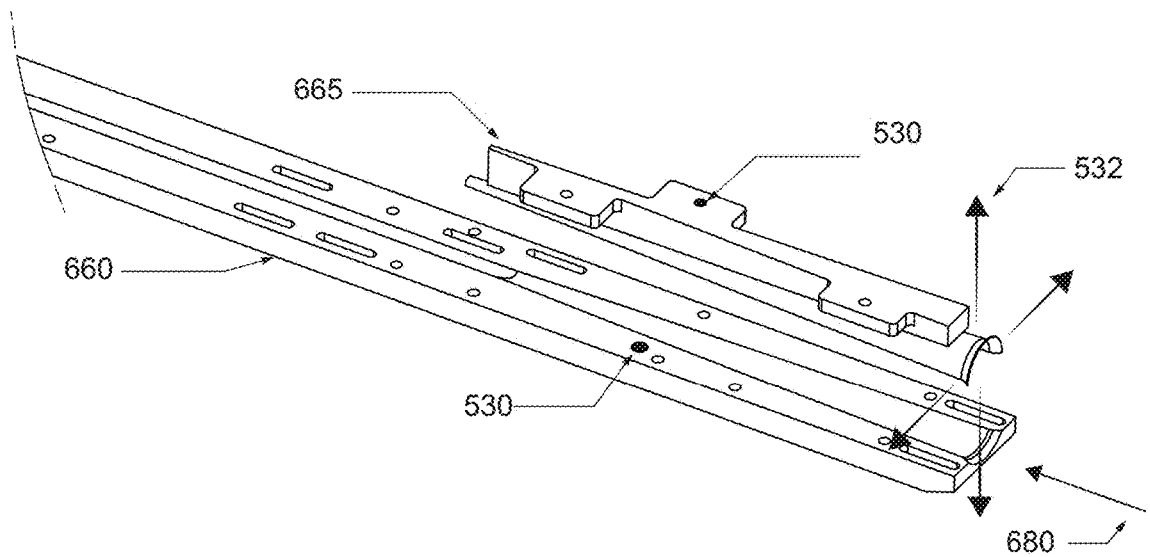
FIG. 15D shows an exemplary perspective view of one embodiment of the at least one adjustable guides of the smoking article machine.
Figure 16:
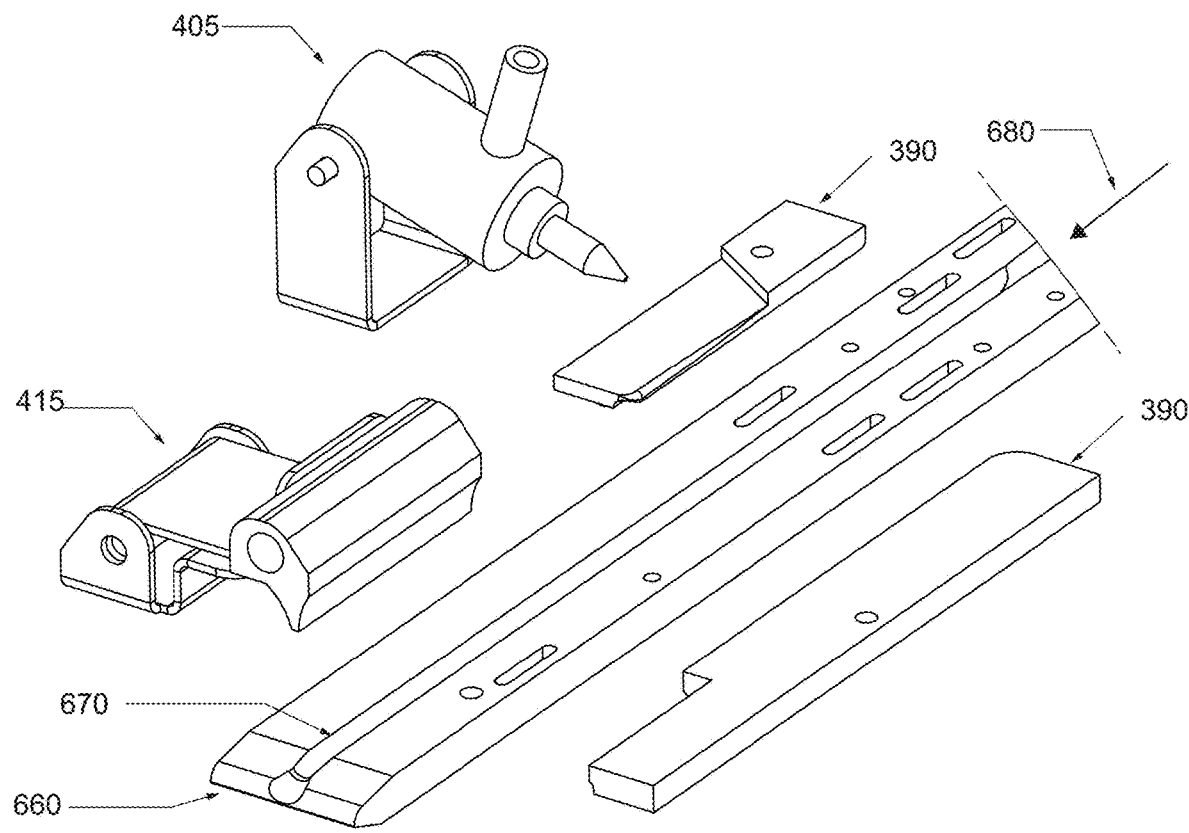
FIG. 16 shows an exemplary perspective view of one embodiment of the combustible material rolling assembly of the smoking article machine.
Figure 17:
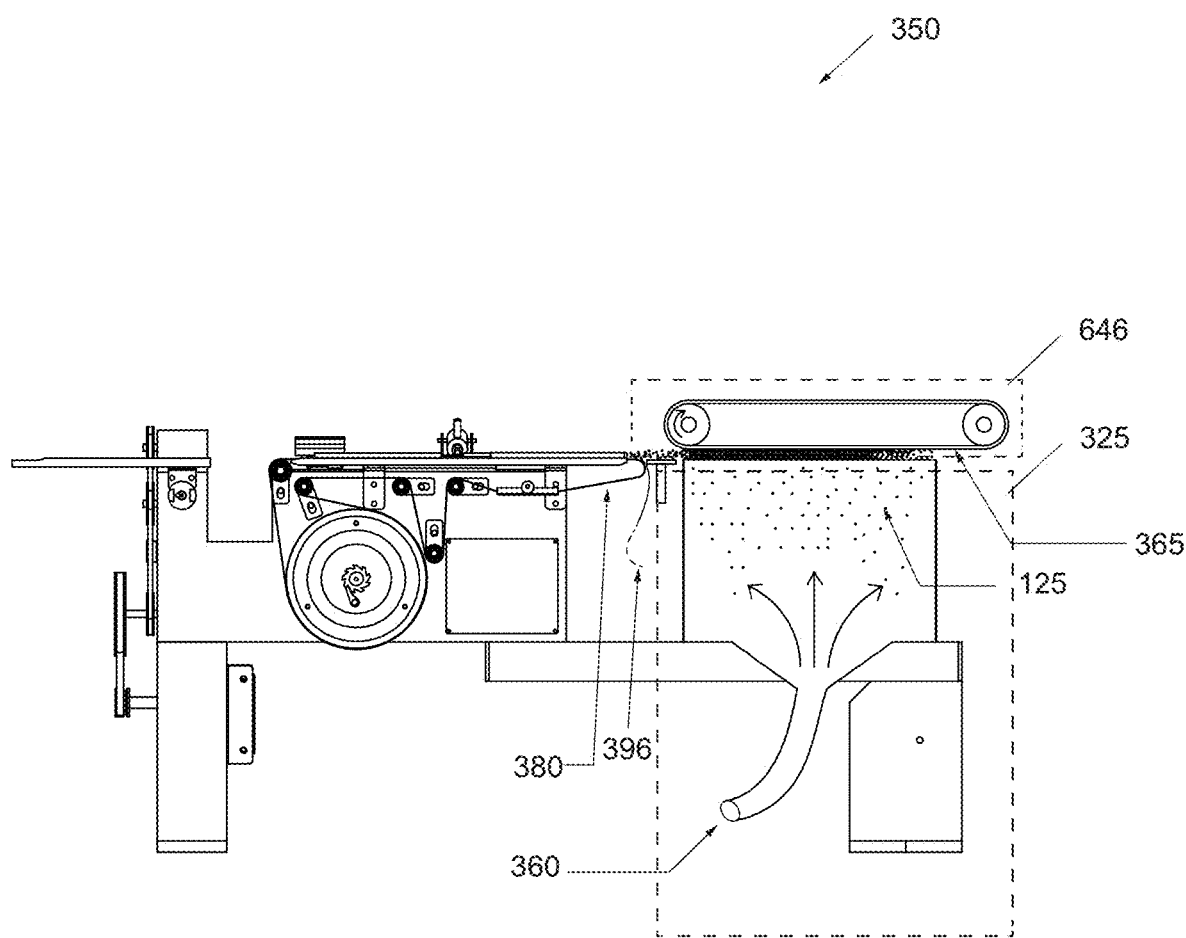
FIG. 17 shows an exemplary front view of one embodiment of the smoking article machine.
Figure 18:
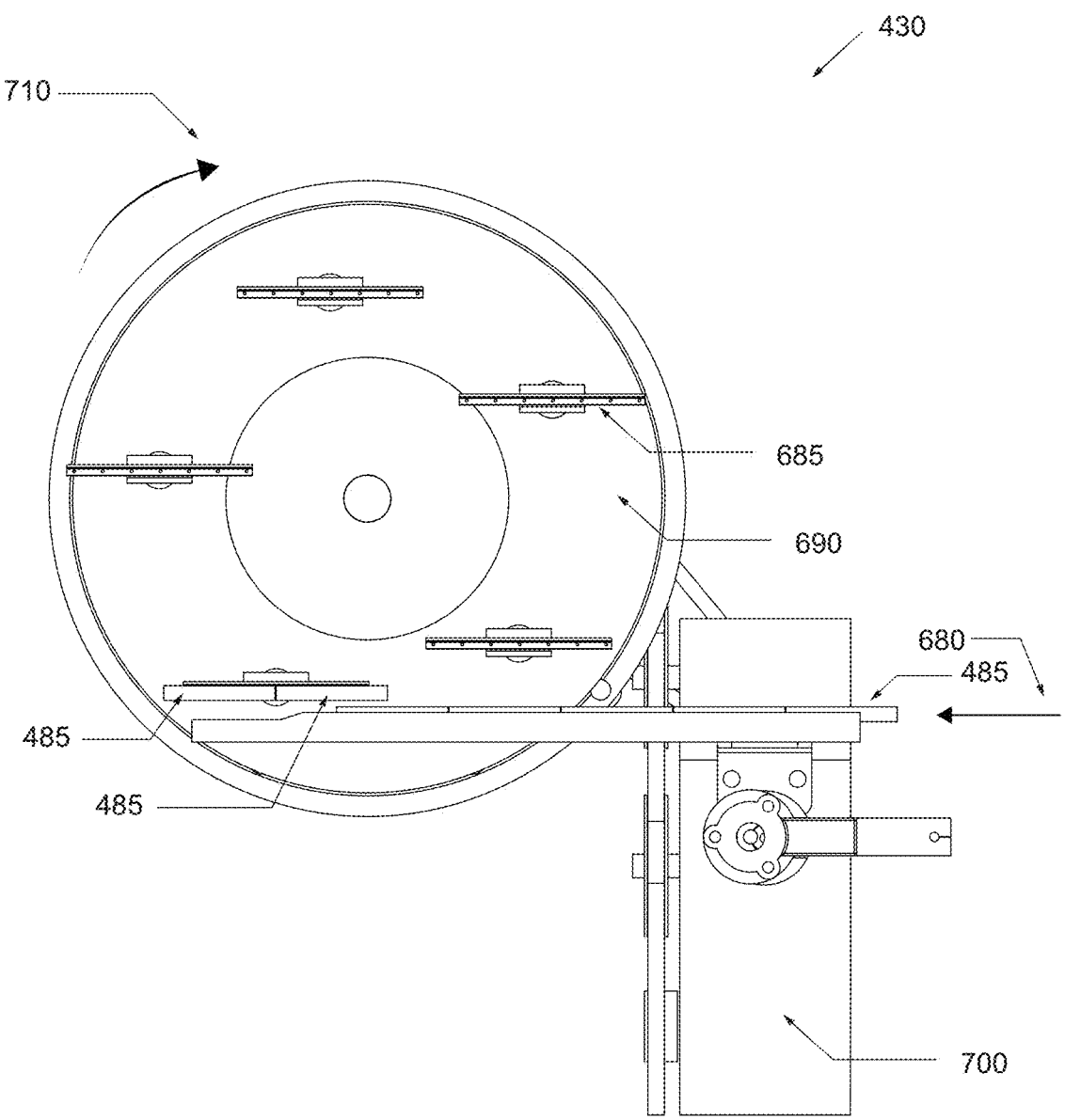
FIG. 18 shows an exemplary perspective view of one embodiment of the rotational transfer assembly of the smoking article machine.
Figure 19:
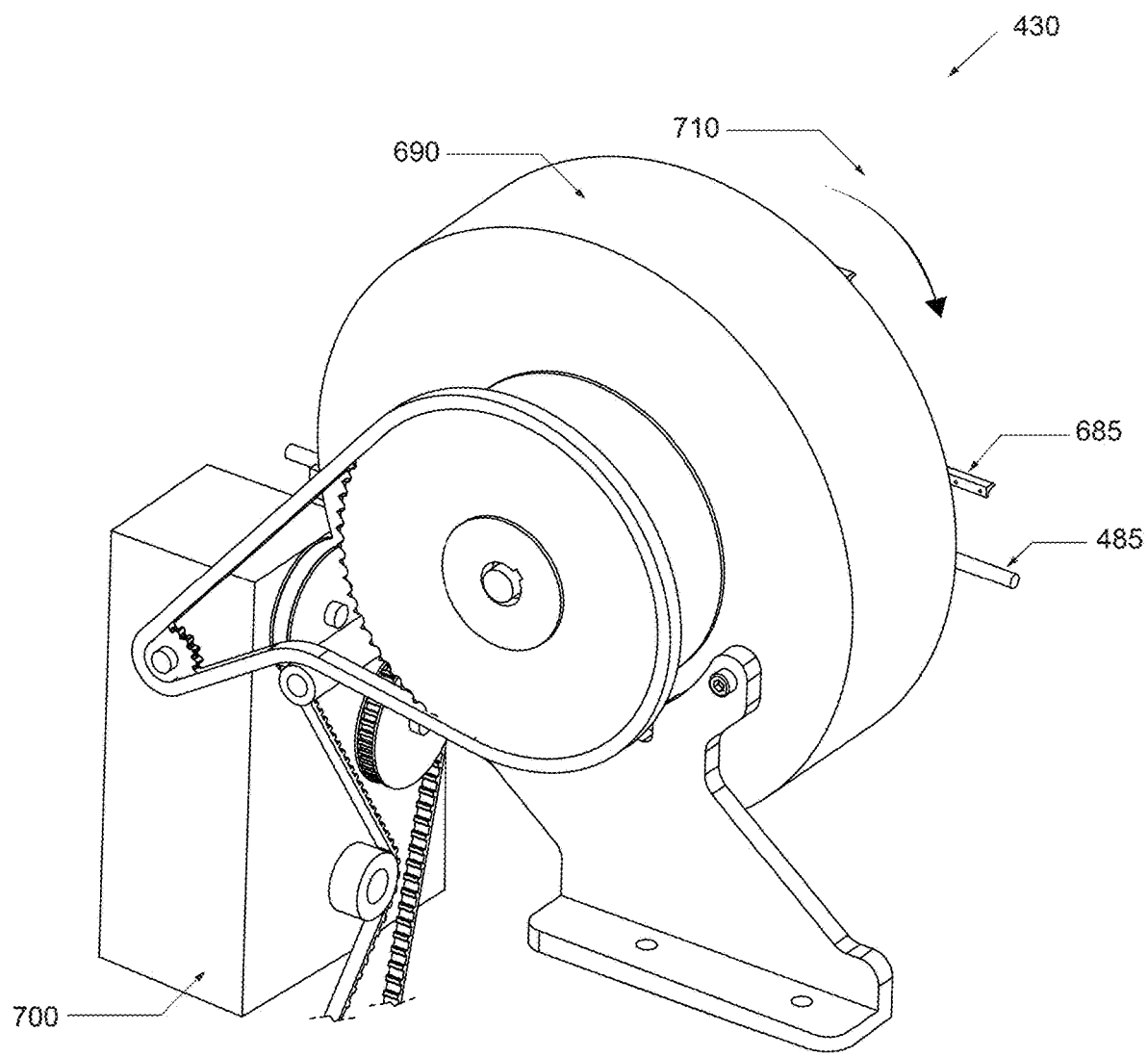
FIG. 19 shows an exemplary perspective view of one embodiment of the rotational transfer assembly of the smoking article machine.
Figure 20:
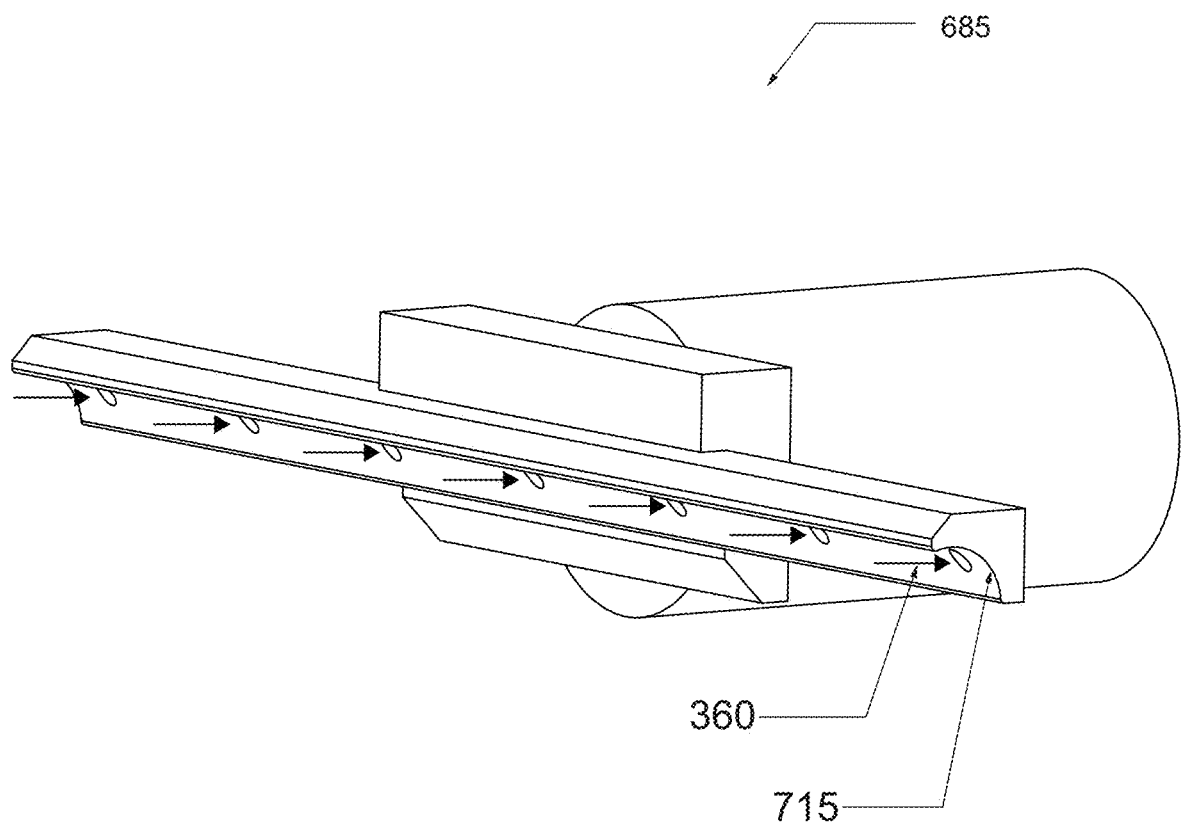
FIG. 20 shows an exemplary perspective view of one embodiment of the plurality of transfer elements of the rotational transfer assembly of the smoking article machine.
Figure 21:
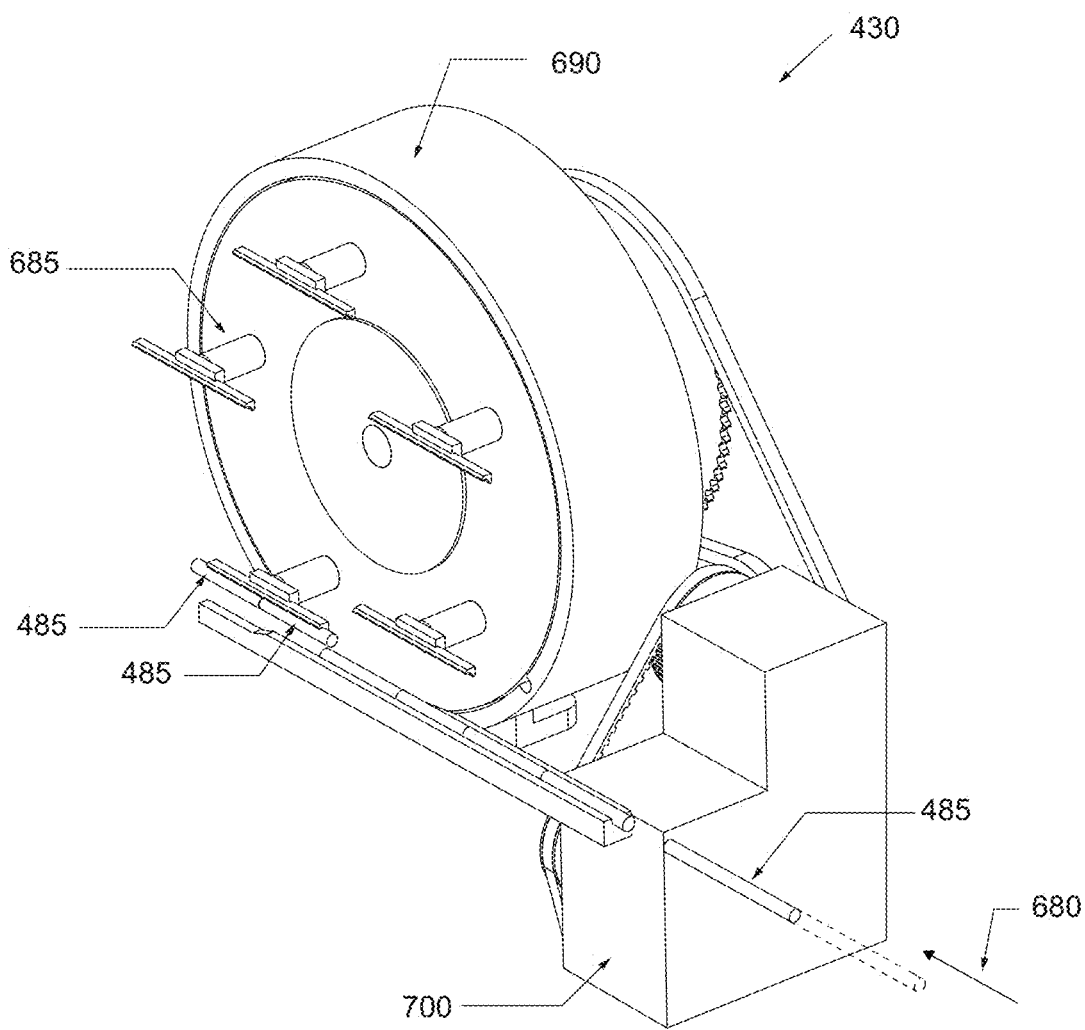
FIG. 21 shows an exemplary perspective view of one embodiment of the rotational transfer assembly of the smoking article machine.
Figure 22:
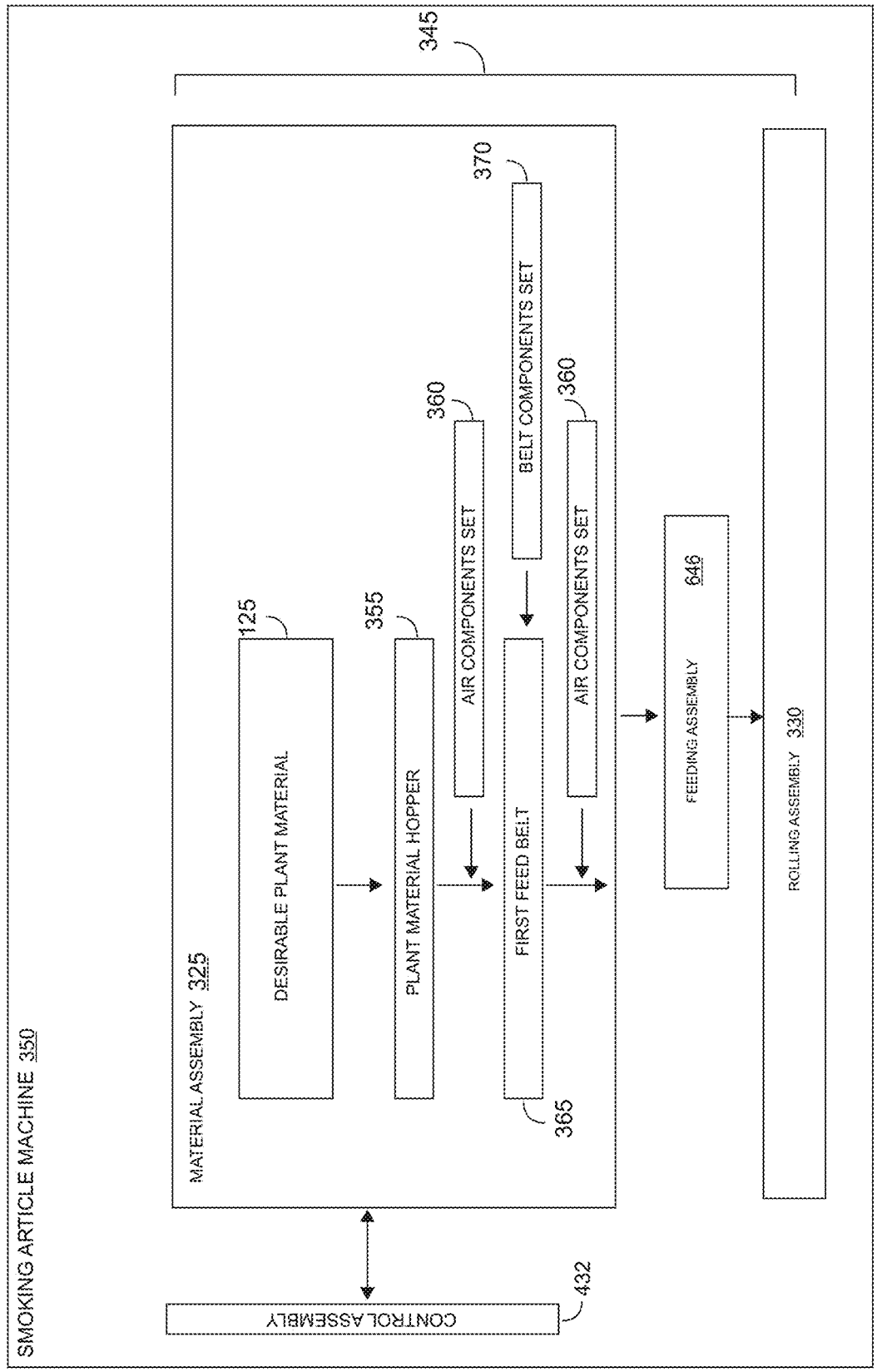
FIG. 22 shows an exemplary flow chart illustrating an embodiment of the smoking article machine.
Figure 23:
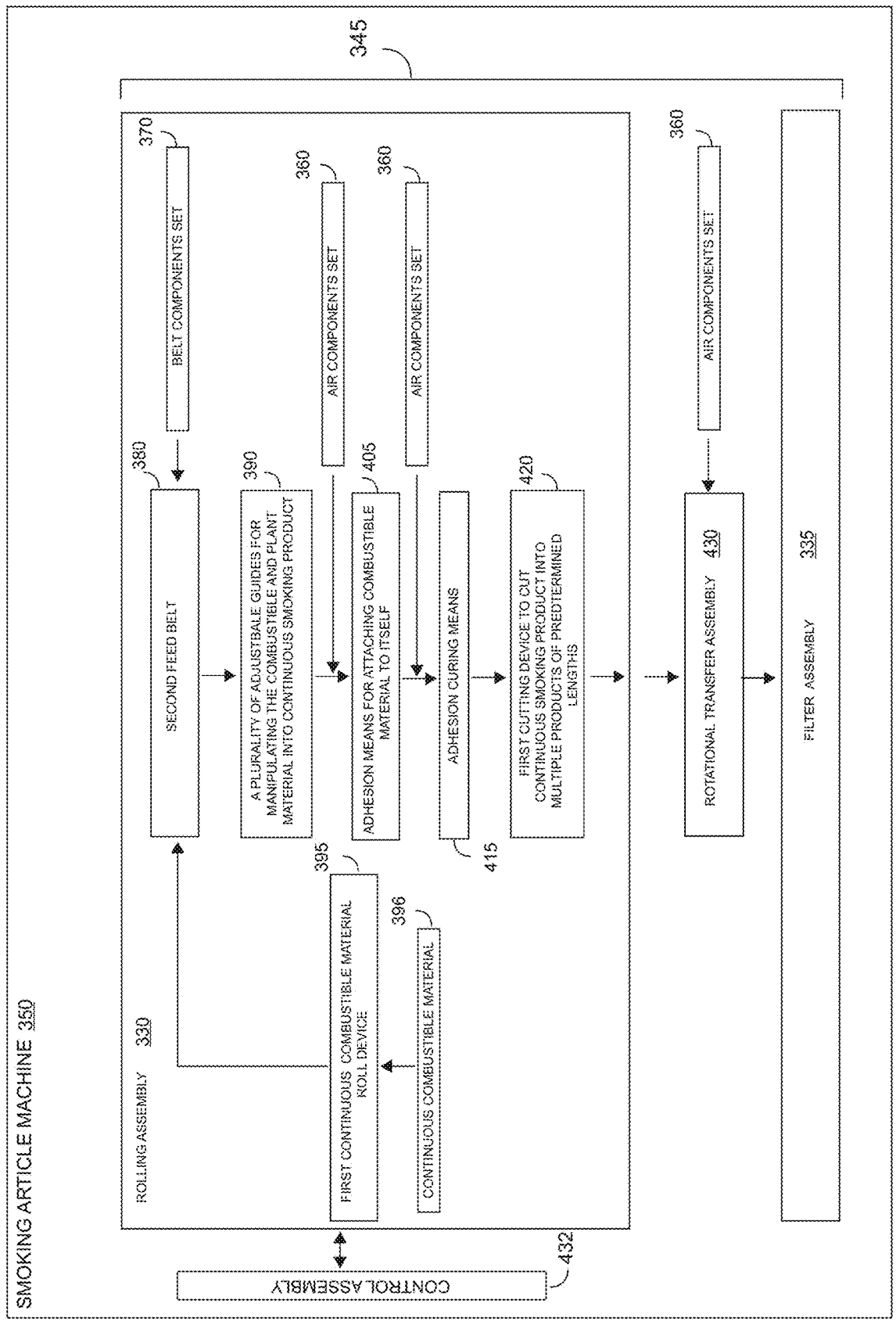
FIG. 23 shows an exemplary flow chart illustrating an embodiment of the smoking article machine.

In the gravity plant material assembly 326, the desirable plant material 125 from the first directional path and the third directional path leads to the gravity feeding assembly 645, and more specifically a first feed belt 365, wherein the first feed belt 365 directs the desirable plant material 125 to the gravity feeding assembly 645, which in turn supplies the desirable plant material 125 to the combustible material rolling assembly 330. The first and third directional paths are in a generally downward direction. Best seen in FIG. 10, the gravity feeding assembly 645 utilizes gravity to feed the plant material 100 to the combustible material rolling assembly 330. In alternative embodiments, the pneumatic feeding assembly 646 utilizes a pneumatic delivery system. However, the gravity feeding assembly 645 is preferred. In some embodiments, the gravity feeding assembly 645 and/or the pneumatic feeding assembly 646 further comprises a plurality of rollers, guides, combs, blades, brushes, or other elements configured to guide the plant material 100, as well as control the delivery rate of the plant material 100 to the combustible material rolling assembly 330.

Referring now to FIGS. 11-17 and 23, the combustible material rolling assembly 330 is illustrated and described. The combustible material rolling assembly 330 is configured to roll the plant material 100 in a continuous stream of paper 396 at a wrapping rate to make at least one smoking article. The continuous stream of paper 396 is fed by the second feed belt 380. In one embodiment, the combustible material rolling assembly 330 comprises the continuous stream of paper 396, a forming chute 660, and at least one adjustable guide 390. The forming chute 660 is a plate having a semispherical channel 670 having a predetermined length in the center of a top surface of the plate. In one embodiment, the predetermined length is at least 3.5 inches. In some embodiments, the predetermined length is at least the length of the at least one smoking article. In some embodiments, the predetermined length is at least 7 inches. In one embodiment, the at least one guide is a left guide mold 525, a right guide mold 526, and a tapered conical guide 665. The tapered conical guide 665 includes a conical angle 675. In some embodiments, the conical angle 675 is adapted for use with specific types of the plant material 100. In one embodiment, at least one adjustment device 530 is positioned on the plate of the forming chute 660 on both sides of the semispherical channel 670. In one embodiment, the at least one adjustment device 530 is positioned on the at least one adjustable guide 390. In one embodiment, the at least one adjustment device 530 is selected from a: a screw, a worm drive, a lever, a clamp, a handle, a knob, and a gear. The at least one adjustable guides 390 is positionable at various locations along the forming chute 660 such that the wrapping rate of the roll via the continuous stream of paper 396 may be adjusted. More specifically, the at least one adjustable guide 390 is configured to be adjusted to a first variable pitch 531 affecting the characteristics of the plant material smoking article 485. The first variable pitch 531 defined by a first position of the at least one guide in relation to the semispherical channel 670 via the at least one adjustment device 530. The tapered conical guide 665 of the at least one guide is configured to be adjusted to a second variable pitch 532 affecting the characteristics of the plant material smoking article 485. The second variable pitch 532 defined by a second position of the tapered conical guide 665 in relation to the semispherical channel 670 via the at least one adjustment device 530. The first variable pitch 531 and the second variable pitch 532, via the at least one guide, adjusts the wrapping rate, which is defined as the rate at which the smoking article is rolled into a cylinder. Advantageously, the wrapping rate and wrapping angle are optimized for use with the plant material 100 being *cannabis*.

In some embodiments, the at least one adjustable guide 390 of the combustible material rolling assembly 330 can be made of or coated in at least one mold material of a mold material set consisting of: a plastic, a thermoplastic material, a polyoxymethylene material, a metal material, a resin material, a polytetrafluoroethylene material, a polyamide material, a polyimide material, a nylon material, a acetal material, a polyester material, a polyetheretherketone, a polyphenylene sulfide material, a ceramic material, a polyethylene material, a Teflon material, a polysulfone material, a polyimide material, a polyphenols material, a phenol material, and a polyphenol material. Advantageously, the materials of the mold material set of the current exemplary embodiments are chosen for their low kinetic and static friction coefficients. In some embodiments, the mold materials of the mold material set have a friction coefficient between 0.02 to 0.8.

The at least one adjustable guide 390 is adjusted to change at least one of the following plant material smoking article's characteristics: diameter of the plant material smoking article 485, density of the plant material smoking article 485, the desirable plant material 125 compression variability between different batches of the desirable plant material 125, a taper of the plant material smoking article 485, and changing friction coefficients between different continuous stream of paper 396 feed by the second feed belt 380.

During operation, the plant material 100 via the gravity feeding assembly 645 or the pneumatic feeding assembly 646, is distributed at a predetermined rate on the continuous stream of paper 396, then the paper 396 is rolled into cylinder (a smoking article) via the semispherical channel 670 and the at least one adjustable guide 390. In one embodiment, the second feed belt 380 transfers the paper 396 throughout the process. An adhesion means 405 is configured to seal the smoking article into the cylindrical shape as well known in the art by attaching the continuous stream of paper 396 on to itself. The smoking article is then cut into multiple smoking articles each at a second length via a first cutting device 420 (not shown). The smoking article is then transferred to the rotational transfer assembly 430.

In some embodiments, the adhesion curing means 415 comprise of at least one of a curing set consisting of: a heater, a visible light source, a non-visible light source, a blower, a laser, a thermoelectric device, and a heat lamp. In some embodiments, the adhesion means 405 include at least one of an adhesion set consisting of a weld, an adhesive, a fold, and a fusion process.

In some embodiments, the first cutting device 420 (not shown) is communicatively coupled with the hardware control of the control assembly 432. In some embodiments, the first cutting device 420 is carried out at a predetermined, random or variable rate, speed, or time period. In some embodiments, the first cutting device 420 is a least one member of a cutting set consisting of: a waterjet device, a whip, a string, a heated string, a laser device, a one-sided blade, a round blade 580, a heated blade, and a wheel 690 driven by a motor assembly 640.

Now referring to FIGS. 18-21, the rotational transfer assembly 430 is illustrated. The rotational transfer assembly 430 is configured to transfer and rotate the smoking article to the filter assembly 335 from the combustible material rolling assembly 330. The rotational transfer assembly 430 comprises a transfer wheel 690, a plurality of transfer elements 685, and a wheel control drive assembly 700. The transfer wheel 690 is configured to rotate in a rotational direction 710 at a rotational speed. In one embodiment, the plurality of transfer elements 685 are attached and positioned radially to the transfer wheel 690, each transfer element of the plurality of transfer elements 685 is configured to receive the smoking article traveling in a first direction 680 at a linear speed from the combustible material rolling assembly 330. In one embodiment, an air component set is provided, wherein the air component set is configured to vacuum and retain the smoking article on the plurality of transfer elements during rotation. In one embodiment, the air component set is at least one of: an air suction device, a blower device, an air compressor, a pneumatic delivery system, a vacuum, and a fan.

In one embodiment, each transfer element of the plurality of transfer elements 685 is aligned parallel to the first direction 680 continuously during rotation. Further, each transfer element includes a semispherical shaped engagement surface 715 configured to engage the smoking article. In one embodiment, the engagement surface has an arc radius approximate to an arc radius of the smoking article. In some embodiments, a plurality of apertures is arranged upon the semispherical shaped engagement surface 715 and extended through the plurality of transfer elements 685. The plurality of apertures in fluid connection with the air components set 360. The wheel control drive assembly 700 is configured to control the rotational speed via the motor assembly 640, gears, and the control assembly 432. It should be understood that other components may be provided in the wheel control drive assembly 700 for operation. The wheel control drive assembly 700 enables the rotational speed to be synchronized with the linear speed such that each transfer element is in the perfect position to accept a new smoking article via the combustible material rolling assembly 330. In the preferred embodiment, each transfer element of the plurality of transfer elements 685 is configured to engage at least two smoking articles.

Figure 24:
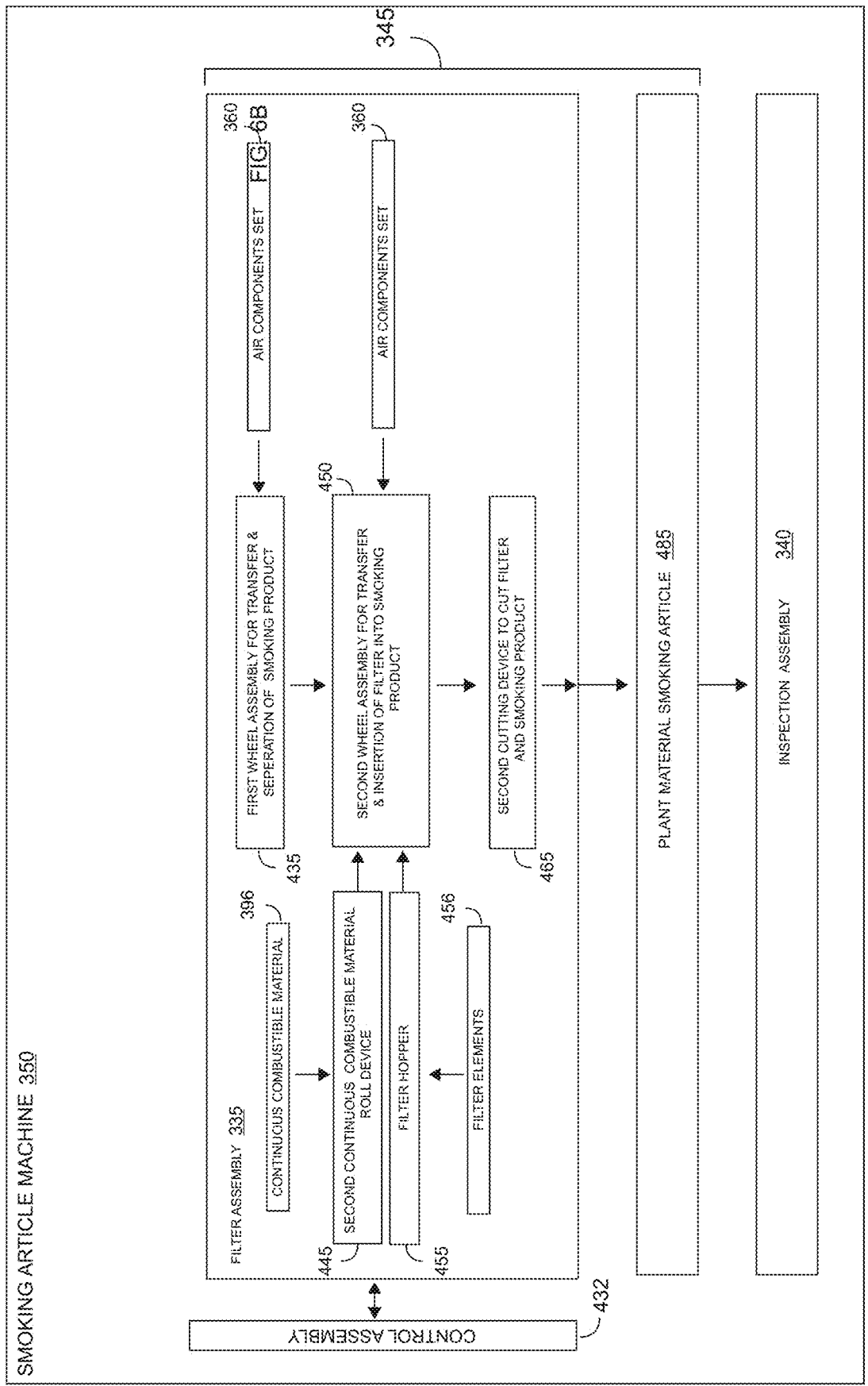
FIG. 24 shows an exemplary flow chart illustrating an embodiment of the smoking article machine.
Figure 25:
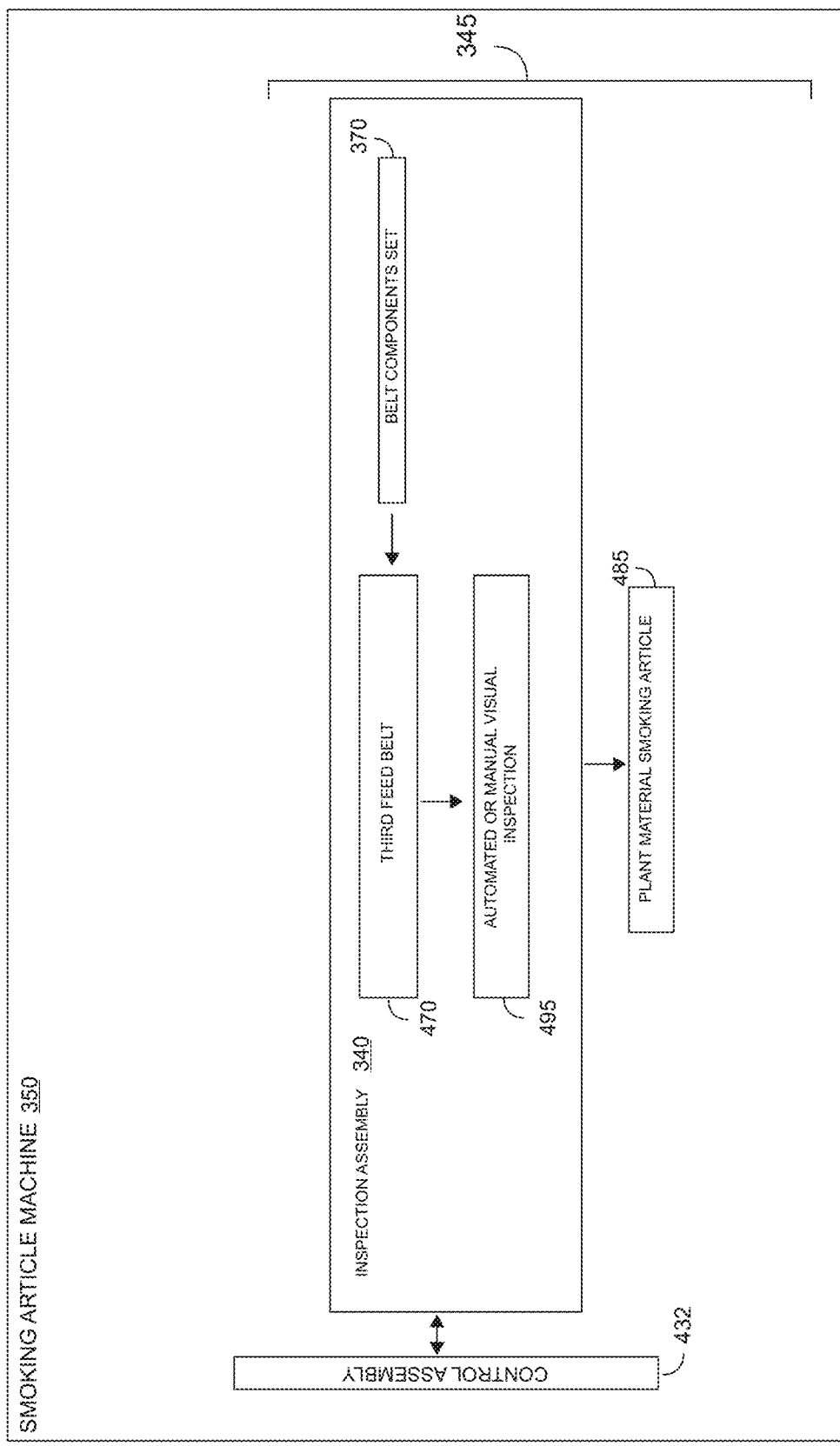
FIG. 25 shows an exemplary flow chart illustrating an embodiment of the smoking article machine.
Figure 26:
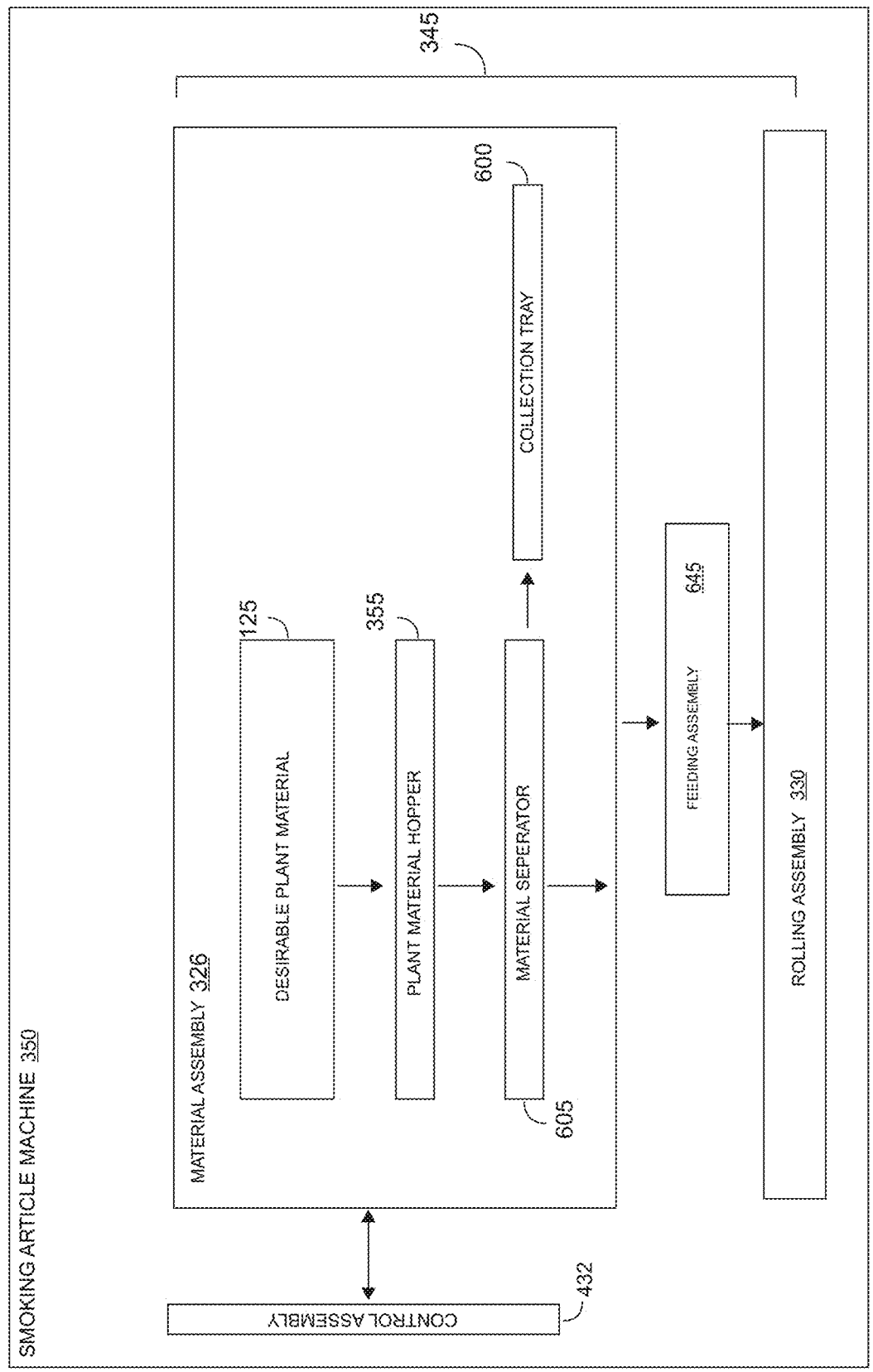
FIG. 26 shows an exemplary flow chart illustrating an embodiment of the smoking article machine.
Figure 27:
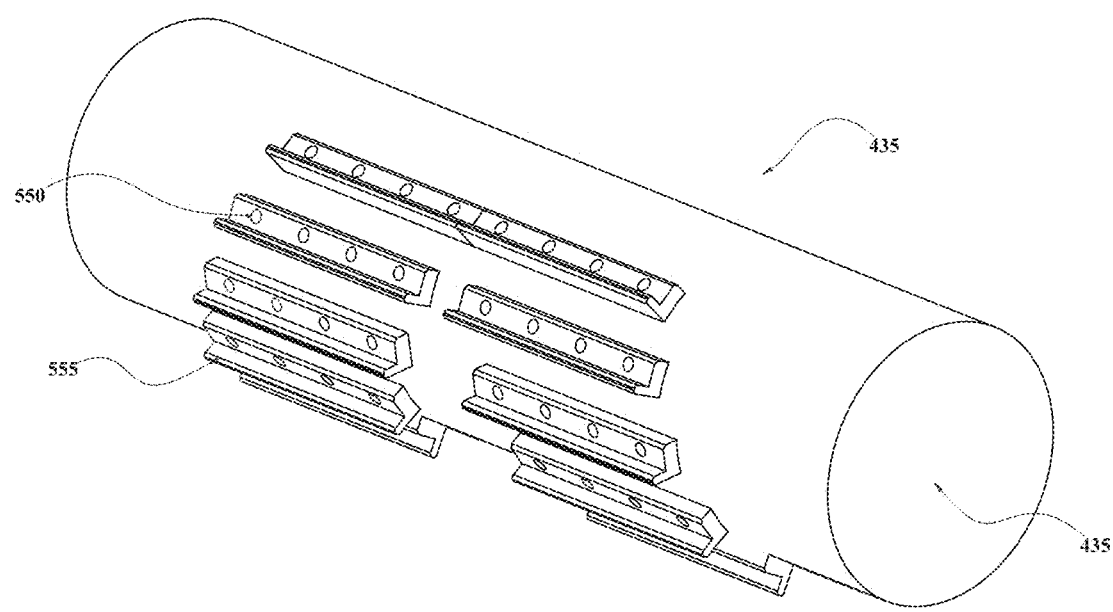
FIG. 27 illustrates an exemplary embodiment of the first wheel assembly for translating and separating the plant material smoking articles produced by the smoking article machine.

Referring now to FIG. 24, components of the filter assembly 335 are described. The rotational transfer assembly 430 delivers the smoking articles to the filter assembly 335 such that filters may be installed on the smoking articles as well known in the art. In the preferred embodiment, two smoking articles per transfer element, transferred via the transfer wheel 690, are outfitted with a single filter, rejoining the two smoking articles as a single smoking article having a filter element 456 centered between and covered by via the continuous steam of paper 396 material from a second continuous combustible material roll device 445. The single smoking article is then cut in half via a second cutting device 465, such that two smoking articles each comprises half of the single filter are provided.

Figure 28:
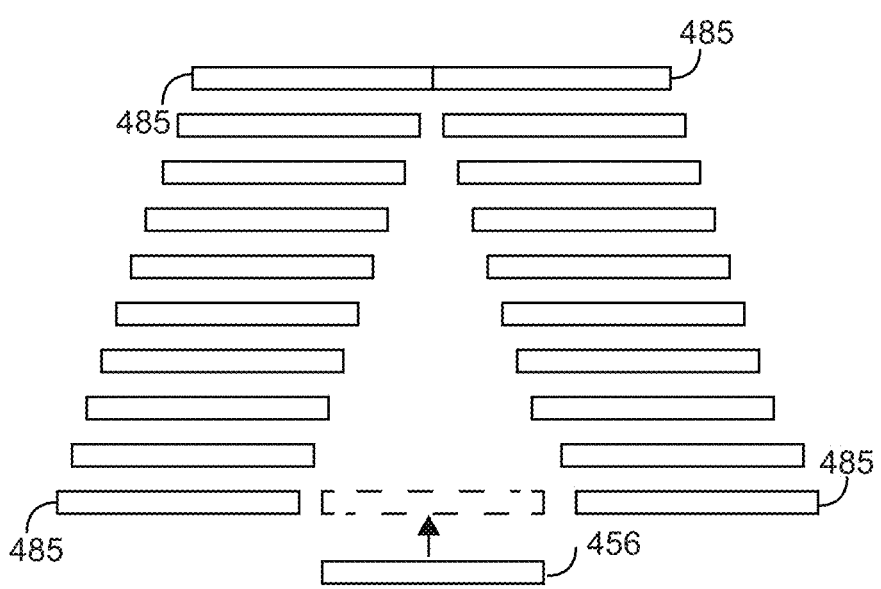
FIG. 28 illustrates a two-dimensional exemplary view of the translation and separation of the plant material smoking articles occurring on the first wheel assembly shown in FIG. 28.
Figure 29:
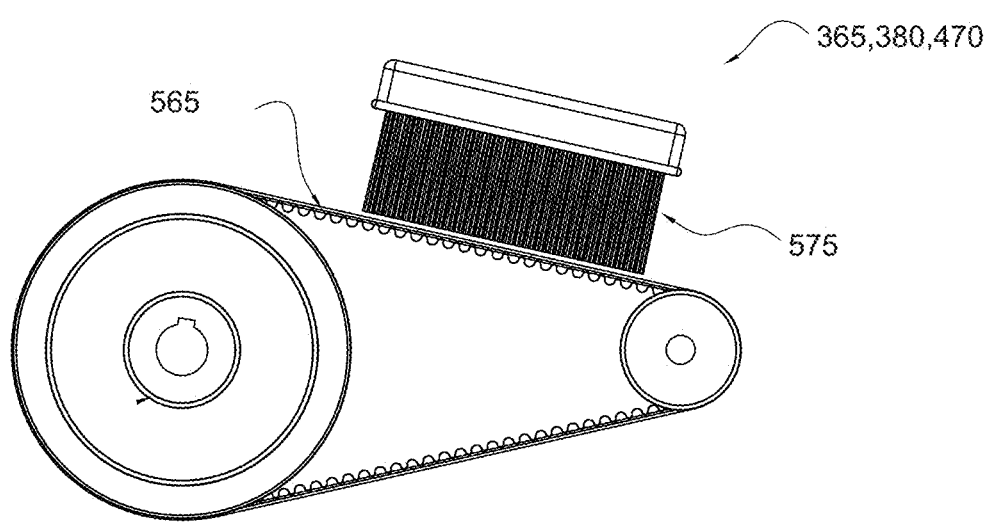
FIG. 29 illustrates an exemplary embodiment of first, second, or third feed belt and an exemplary embodiment of a member of the belt components set for cleaning plant material accumulated on the first, second, or third feed belt of the smoking article machine.
Figure 30:
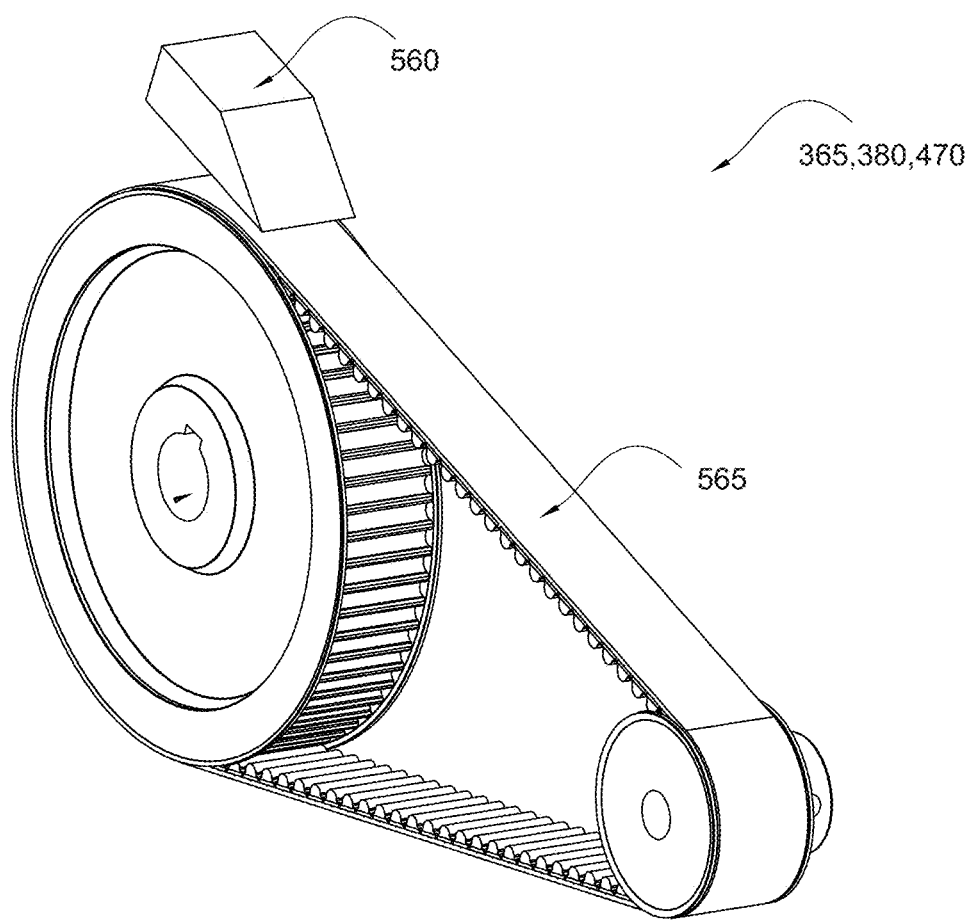
FIG. 30 illustrates an exemplary embodiment of first, second, or third feed belt and an exemplary embodiment of a member of the belt components set for cleaning plant material accumulated on the first, second, or third feed belt of the smoking article machine.
Figure 31:
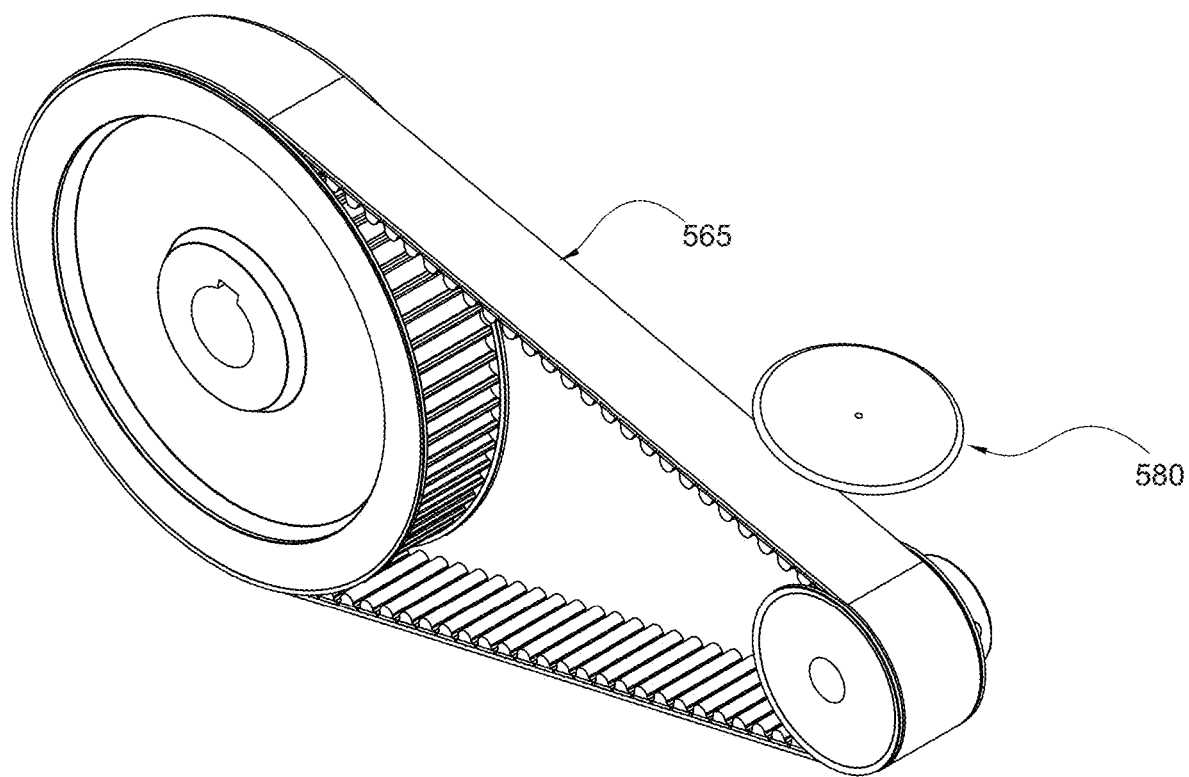
FIG. 31 illustrates an exemplary embodiment of first, second, or third feed belt and an exemplary embodiment of a member of the belt components set for cleaning and adjusting the density of plant material accumulated on the first, second, or third feed belt of the smoking article machine.
Figure 32A:
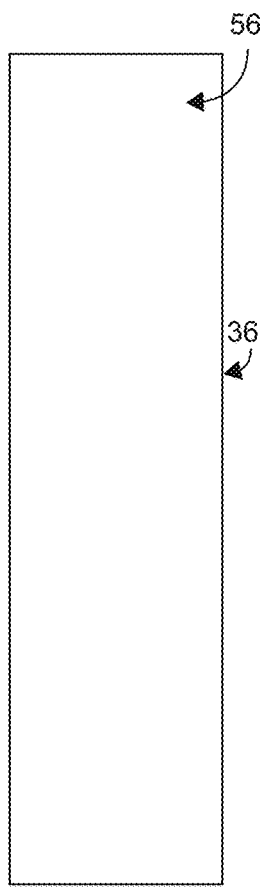
FIG. 32A illustrates an exemplary solid material embodiment of the first, second or third feed belt of the smoking article machine.
Figure 32B:
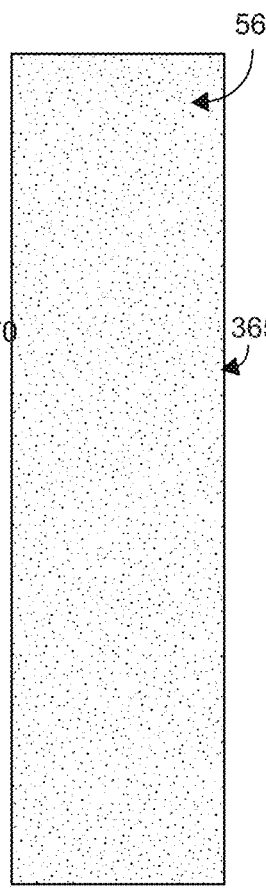
FIG. 32B illustrates an exemplary textured material embodiment of the first, second or third feed belt of the plant material smoking article machine.
Figure 32C:
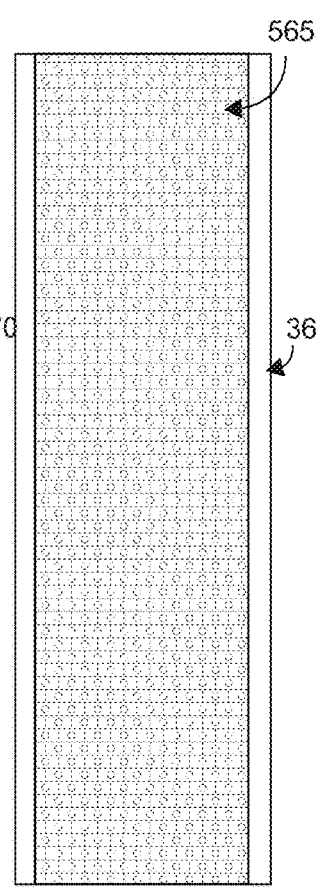
FIG. 32C illustrates an exemplary perforated material embodiment of the first, second or third feed belt of the plant material smoking article machine.

More specifically, a first wheel assembly 435 of the filter assembly 335 continues the forming process 345 by translating, separating, and aligning the at least one plant material smoking article 485 along a central longitudinal axis of the plant material smoking article 485. This separation, carried out by the first wheel assembly 435, prepares at least one of the plant material smoking article 485 for the insertion and joining of a filter element 456 in the second wheel assembly 450. This can be seen in an exemplary 2D plot in FIG. 28. The first wheel assembly 435 of the filter assembly 335 further comprises one wheel driven by the motor assembly 640 of the smoking article machine 350. The first wheel assembly 435 may be made of at least one of the following materials: a metal, a composite, a ceramic, a thermoplastic, and a plastic. The second wheel assembly 450 of the filter assembly 335 further comprises at least one wheel driven by the motor assembly 640 of the smoking article machine 350. In some embodiments, the filter assembly 335 is elixated entirely when a filter element 456 is not added to plant material smoking article 485. The second wheel assembly 450 may be made of at least one of the following materials: a metal, a composite, a ceramic, a thermoplastic, and a plastic. In some embodiments, the first wheel assembly 435 and second wheel assembly 450 of the filter assembly 335 may utilize a member of the air components set 360 to hold or move plant material smoking articles 485 against a wheel 690 or away from a wheel 690 of the first wheel assembly 435 or second wheel assembly 450.

In one embodiment, the filter hopper 455 is located above the second wheel assembly 450 and inserts the filter elements 456 between at least one of the plant material smoking article 485 by mechanical means, pneumatic means, or by gravity. In some embodiments, the filter hopper 455 further comprises a vibratory member to vibrate the filter hopper 455. Furthermore, the joining of a filter element 456 is joined at a location on one face of the plant material smoking article 485 normal to or about normal to the central longitudinal axis of the plant material smoking article 485. The joining method of the filter element 456 to the plant material smoking article 485 is carried out by further wrapping the filter element 456 and at least one of the plant material smoking article 485 in the continuous stream of paper 396 supplied by the second continuous combustible material roll device 445. In one embodiment, the central longitudinal axis is co-linear with the first direction 680.

In some embodiments, the continuous stream of paper 396 is pulled from the second continuous combustible material roll device 445 by a wheel 690 member of the second wheel assembly 450. The continuous stream of paper 396 is fed by the first continuous combustible material roll device 395 and second continuous combustible material roll device 445. The continuous stream of paper 396 is made of at least one member of a combustible material set consisting of: a flax material, a hemp material, a sisal material, rice material, a straw material, a cellulose material, and an esparto material. In some embodiments, the continuous stream of paper 396 is further modified by a visible color, a printed alphanumerical symbol, a pattern, a number, or a brand. In some embodiments, the continuous stream of paper 396 further comprises a natural flavoring, an artificial flavoring, or an essential oil.

In some embodiments, the continuous stream of paper 396 is pulled from the second continuous combustible material roll device 445 by a member of the motor assembly 640.

The plant material smoking article 485, with a filter element 456 attached thereto, is cut by a second cutting device 465, leaving a portion of the filter element 456 attaches to at least one of the plant material smoking article 485. In some embodiments, the second cutting device 465 is communicatively coupled with the hardware control of the control assembly 432. In some embodiments, the second cutting device 465 is carried out at a predetermined, random or variable rate, speed or time period. In some embodiments, the speed of the second cutting device 465 in a function of the second wheel assembly 450 controlled by the control assembly 432. In some embodiments, the second cutting device 465 is a least one member of a cutting set consisting of: a waterjet device, a laser device, a one-sided blade, a round blade 580, a heated blade, and a wheel 690 driven by the motor assembly 640.

In some embodiments, the filter element 456 is made of at least one material of a filter material set consisting of: a plant-based material, a paper 396 material, a biodegradable material, a bridgeable material, a cellulose material, and a glass material. In some embodiments, the filter element 456 has a cross-sectional shape of one of the following shapes: a rectangle, a circle, an oval, a square, and a shape with more than 4 sides. In some embodiments, the filter element 456 cross-sectional shapes may vary in surface area along a longitudinal length of the filter element 456. In some embodiments, the longitudinal length of the filter element 456 is no more than 75% of the respective length of the plant material smoking article 485 produced by the smoking article machine 350.

Finally, in the final stage of the forming process 345 of the smoking article machine 350, an inspection process 107 is undertaken wherein the plant material smoking article 485 exits the filter assembly 335 and a third feed belt 470 moves the plant material smoking articles 485 by or through an inspection means 495 for verifying the plant material smoking article 485 shape, color, size, defective products, density, or moisture content. In some embodiments, the inspections means 495 is a visual inspection device communicatively coupled to the control assembly 432 of the smoking article machine 350. In some embodiments, the visual inspection device comprises at least one of the following: a camera, an infrared camera, a thermal camera. In some embodiments, a visual inspection device utilizes at least one of an artificial intelligence algorithm, a machine learning algorithm or an image processing algorithm. This concludes an exemplary 2D description of the forming process 345 carried out by the smoking article machine 350 for making plant material smoking articles 485.

In some embodiments, the first feed belt 365, the second feed belt 380 and the third feed belt 470 of the smoking article machine 350 further comprises at least one component of a belt components set 370 comprising of: a flat brush 575, a wheel 690 brush, a flat blade 560, a round blade 580, a material collection bin, and a rubber component. In some embodiments, the first feed belt 365, the second feed belt 380 and the third feed belt 470 of the smoking article machine 350 further comprises at least one type of belt of belt type set comprising of: a solid belt, a toothed belt, a v-belt, a round belt, a flat belt, a timing belt, a banded belt. In some embodiments, the first feed belt 365, the second feed belt 380 and the third feed belt 470 of the smoking article machine 350 is made of at least one belt material of belt material set comprising of: a rubber material, a PVC material, a urethane material, a polyurethane material, a silicone material, a Hytrel material, a fabric material, a felt material, a metal, a Neoprene material, Nylon material, a Nitrile material, a Polyester material, and a leather material. In some embodiments, the first feed belt 365, the second feed belt 380 and the third feed belt 470 of the smoking article machine 350 further comprises a belt texture 565 including at least one component of belt texture 565 set comprising of: a sandpaper texture, a perforated texture, a solid texture, a toothed texture, a slotted texture, a ribbed texture, and a knobbed texture.

Figure 33:
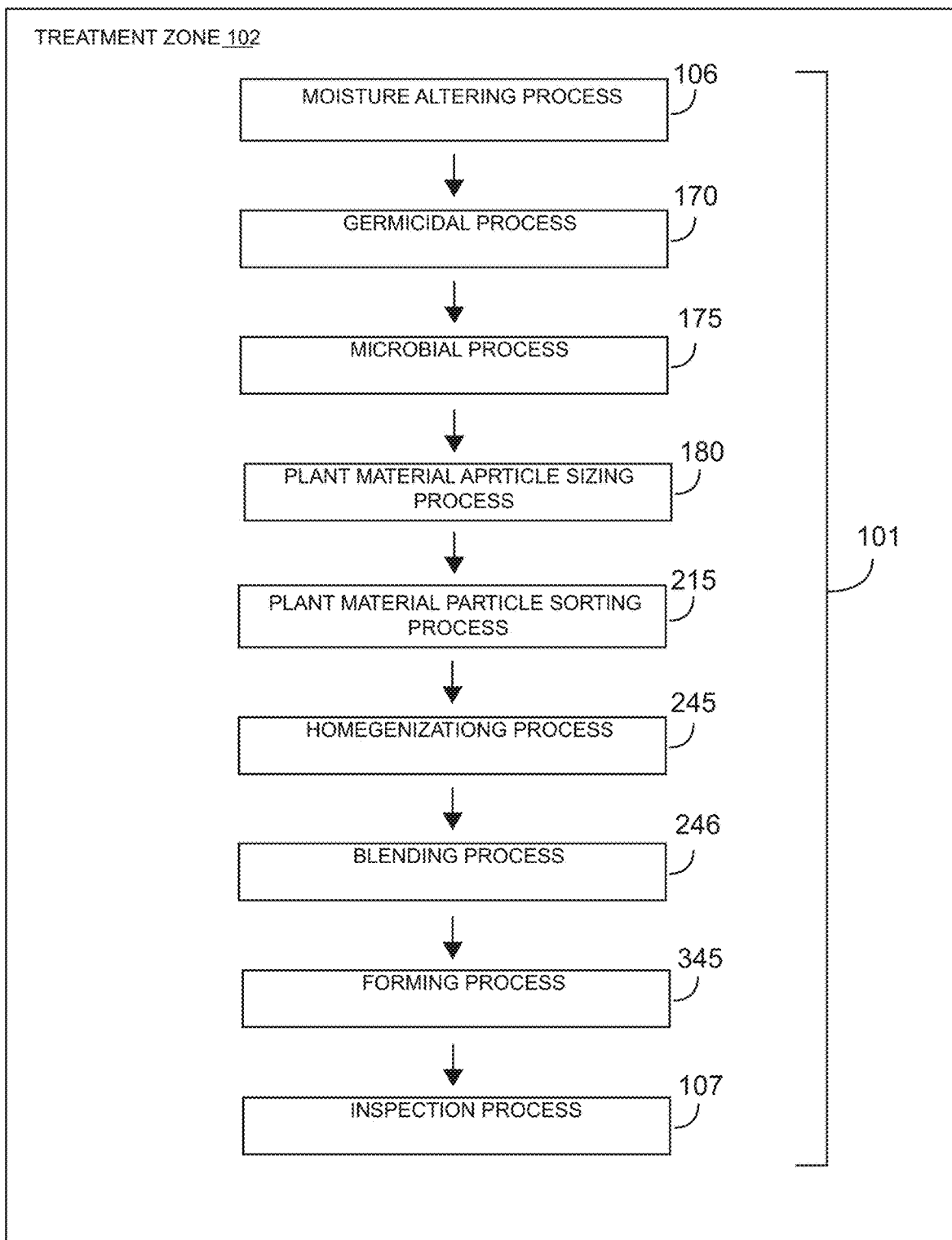
FIG. 33 illustrates an exemplary flow chart illustrating the plant material preparation process, the forming process and the inspection process in the treatment zone, in accordance with an embodiment of the present disclosure.

FIG. 33 details an optional plant material preparation processing prior to the forming process 345 discussed above. The optional plant material process comprises the following steps: a moisture altering process 106, a germicidal process 170, a microbial process 175, a plant material particle size reduction process 180, a plant material sorting process 215, a homogenization process 245, and a blending process 246. Then the plant material 100 is processed though previously discussed processes such as the forming process 345 and the inspection process 107. The treatment zone 102 for the optional plant material process includes, by way of non-limiting example, an isobaric chamber, an isochoric chamber, an isothermal chamber, a room, a container, a building, and a chamber open to the ambient environment.

The control assembly 432 discussed herein is configured to control various elements of the machine throughout the forming process 345. In some embodiments, the control assembly 432 further comprises a temperature control, altering the temperature of the operating environment or the treatment zone 102 around or within the smoking article machine 350. In one embodiment, the temperature control of the control assembly 432 is selected from one member of a temperature control set consisting of: a resistive temperature sensor, a thermocouple, a semiconductor-based temperature sensor, a thermistor, a digital processing device, a microcontroller, a programmable logic controller, a relay, and a solid-state relay. In some embodiments, the temperature control regulates the temperature of the treatment zone 102.

In some embodiments, the control assembly 432 further comprises a humidity control, altering the humidity of the operating environment around or within the smoking article machine 350. Wherein the humidity control of the control assembly 432 is selected from one member of a humidity control set consisting of: a humidity sensor, a hygrometer, a capacitive relative humidity sensor, a resistive relative humidity sensor, a thermal conductivity sensor, a digital processing device, a microcontroller, a programmable logic controller, a relay, and a solid-state relay. In some embodiments, the humidity control regulates the humidity of the treatment zone 102.

In some embodiments, the control assembly 432 further comprises a hardware control, altering the rate of production of the smoking article machine 350. Wherein the hardware control is selected from one member of a hardware control set consisting of: a digital processing device, a microcontroller, a programmable logic controller, a relay, and a solid-state relay. In some embodiments, the hardware control of the control assembly 432 is in functional communication with the motor assembly 640, the gravity plant material assembly 326, the combustible material rolling assembly 330, the rotational transfer assembly 430, the filter assembly 335 and the inspection assembly 340. In some embodiments, the hardware control controls least one of a control set consisting of amperage, voltage, gear, polarity, and any digital aspect supplied by the motor assembly 640.

In some embodiments, the control assembly 432 further comprises an input device configured to receive an input. Wherein the input of the control assembly 432 is selected from one member of an input device set consisting of: a keyboard, a button, a switch, a potentiometer, a dial, a mouse, a trackball, a track pad, a joystick, a game controller, a stylus, a touch screen, and a multi-touch screen. In other embodiments, the input device set of the control assembly 432 is a microphone to capture voice or other sound input. In other embodiments, the input device set is a video camera or other sensor to capture motion or visual input. In still further embodiments, the input device is a combination of devices such as those disclosed herein. The input of the control assembly 432, in some embodiments, is in functional communication with at least one other member of the control assembly 432 including the temperature control, the hardware control and the humidity control.

In some embodiments, the platforms, systems, media, and methods described herein include a digital processing device or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the digital processing device includes a storage and/or memory device. The storage and/or memory device is one or more physical apparatuses used to store data or programs on a temporary or permanent basis. In some embodiments, the device is a volatile memory and requires power to maintain stored information. In some embodiments, the device is a non-volatile memory and retains stored information when the digital processing device is not powered. In further embodiments, the non-volatile memory comprises flash memory. In some embodiments, the non-volatile memory comprises a dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

The digital processing device, in some embodiments, may run on a suitable programming language. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof. Suitable programming languages, in some embodiments, may use control logic including by way of non-limiting example, machine learning, fuzzy logic control, PID control, proportional control, open-loop control, closed-loop control, and linear control.

As *cannabis* plant material is the preferred plant material, it should be understood that the plant material 100 may be subjected to federal and/or state regulations. Thus, depending on the regulations certain restrictions will be adhered to without departing from the spirit and scope of the invention. For instance, federal law now allows certain low-THC varieties of *cannabis* to be classified as "hemp," which qualifies for regulatory allowances not available for other varieties of *cannabis*. Products, whether recreational or industrial, derived from such low-THC varieties of *cannabis* are commonly known as hemp products. Thus, a *cannabis* smoking article made from a low-THC variety of *cannabis* may be called a plant material smoking article 485, wherein the *cannabis* has a THCA, DELTA-9 THC, THC, TOTAL THC content or any combination thereof that is equal to or less than 0.3% by weight. One skilled in the art of *cannabis* cultivation and/or the study of *cannabis* will recognize that *cannabis* content limitations, concentrations and classifications potentially utilized with the present invention are constantly changing and re-configurable to match current state, federal and international laws and regulations.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A machine for making plant material smoking articles comprising:
    a feeding assembly, and
    a combustible material rolling assembly, wherein the feeding assembly is configured to feed plant material to the combustible material rolling assembly;
    a continuous stream of paper and a forming chute having a semispherical channel at a length, and at least one adjustable guide;
    wherein the combustible material rolling assembly is configured to roll the plant material in the continuous stream of paper at a wrapping rate to form at least one plant material smoking article, and wherein the at least one adjustable guide comprises components which are positioned on a top surface of the forming chute on both sides of the semispherical channel, the at least one adjustable guide being configured to adjust the wrapping rate.

2. The machine for making plant material smoking articles of claim 1, wherein the feeding assembly feeds the plant material via gravity.

3. The machine for making plant material smoking articles of claim 1, wherein the feeding assembly feeds the plant material via a pneumatic delivery system.

4. The machine for making plant material smoking articles of claim 1, wherein the wrapping rate is adjusted via a first variable pitch defined by a positioning of the components of the at least one adjustable guide in relation to the semispherical channel.

5. The machine for making plant material smoking articles of claim 4, wherein the at least one adjustable guide includes a tapered conical guide having a second variable pitch defined by a positioning of the tapered conical guide in relation to the semispherical channel.

6. The machine for making plant material smoking articles of claim 1, wherein the plant material is *cannabis* plant material and the wrapping rate is optimized for use with the *cannabis* plant material.

7. The machine for making plant material smoking articles of claim 1, wherein the length of the forming chute is at least the length of the at least one plant material smoking article.

8. The machine for making plant material smoking articles of claim 1, wherein the wrapping rate is adapted for a specific variety of *cannabis*.

9. The machine for making plant material smoking articles of claim 1, wherein the length of the forming chute is adapted to use with a specific variety of *cannabis*.

10. The machine for making plant material smoking articles of claim 1, wherein the length of the forming chute is at least 3.5 inches.

11. The machine for making plant material smoking articles of claim 1, wherein the length of the forming chute is at least 7 inches.

* * * * *